US012680014B2

(12) United States Patent
Smalls et al.

(10) Patent No.: US 12,680,014 B2
(45) Date of Patent: Jul. 14, 2026

(54) ELECTRO-HYDROFRACTURING USING ELECTRICALLY CONDUCTIVE PROPPANTS AND RELATED METHODS

(71) Applicant: Eden GeoPower, Inc., Somerville, MA (US)

(72) Inventors: Paris Smalls, Boston, MA (US); Mehrdad Mehrvand, Somerville, MA (US); Ammar Alali, Cambridge, MA (US); Marybeth Lundquist, The Woodlands, TX (US)

(73) Assignee: Eden GeoPower, Inc., Somerville, MA (US)

( * ) Notice: Subject to any disclaimer, the term of this patent is extended or adjusted under 35 U.S.C. 154(b) by 0 days.

(21) Appl. No.: 18/509,897

(22) Filed: Nov. 15, 2023

(65) Prior Publication Data

US 2024/0209253 A1 Jun. 27, 2024

Related U.S. Application Data

(62) Division of application No. 17/887,822, filed on Aug. 15, 2022, now abandoned.

(Continued)

(51) Int. Cl.
| | |
|---|---|
| *E21B 43/267* | (2006.01) |
| *C09K 8/64* | (2006.01) |
| *C09K 8/66* | (2006.01) |
| *C09K 8/70* | (2006.01) |
| *C09K 8/80* | (2006.01) |
| *E21B 36/00* | (2006.01) |
| *E21B 49/00* | (2006.01) |

(52) U.S. Cl.
CPC ............... *C09K 8/805* (2013.01); *C09K 8/64* (2013.01); *C09K 8/665* (2013.01); *C09K 8/70* (2013.01); *E21B 36/001* (2013.01); *E21B 43/267* (2013.01); *E21B 49/00* (2013.01)

(58) Field of Classification Search
None
See application file for complete search history.

(56) References Cited

U.S. PATENT DOCUMENTS

| | | | | |
|---|---|---|---|---|
| 3,638,727 | A | * | 2/1972 | Allen .................. E21B 43/2605 166/260 |
| 3,642,066 | A | | 2/1972 | Gill |

(Continued)

FOREIGN PATENT DOCUMENTS

| | | |
|---|---|---|
| CN | 110984941 A | 4/2020 |
| CN | 111350496 A | 6/2020 |

(Continued)

OTHER PUBLICATIONS

International Search Report and Written Opinion for International Application No. PCT/US2022/040288, mailed Nov. 15, 2022.

(Continued)

*Primary Examiner* — Andrew Sue-Ako
(74) *Attorney, Agent, or Firm* — Wolf, Greenfield & Sacks, P.C.

(57) ABSTRACT

The present disclosure describes electro-hydrofracturing (E-HF) using electrically conductive proppants and methods for hydraulic fracturing using electrically conductive proppants.

27 Claims, 13 Drawing Sheets

Related U.S. Application Data

(60) Provisional application No. 63/259,914, filed on Aug. 16, 2021.

(56) References Cited

U.S. PATENT DOCUMENTS

| | | | |
|---|---|---|---|
| 3,664,420 | A | 5/1972 | Graham et al. |
| 3,782,465 | A | 1/1974 | Bell et al. |
| 4,576,231 | A | 3/1986 | Dowling et al. |
| 9,080,441 | B2 | 7/2015 | Meurer et al. |
| 9,243,487 | B2 | 1/2016 | Geilikman et al. |
| 9,890,627 | B2 | 2/2018 | Kasevich et al. |
| 11,091,991 | B1 | 8/2021 | Mehrvand et al. |
| 11,649,710 | B2 | 5/2023 | Alali et al. |
| 11,788,394 | B2 | 10/2023 | Mehrvand et al. |
| 2008/0087428 | A1 | 4/2008 | Symington et al. |
| 2008/0173443 | A1* | 7/2008 | Symington ......... E21B 43/2405 166/248 |
| 2013/0199789 | A1* | 8/2013 | Liang .................... E21B 43/263 166/305.1 |
| 2014/0096953 | A1* | 4/2014 | Hocking ................. E21B 36/04 166/248 |
| 2015/0167439 | A1* | 6/2015 | Kasevich ................. E21B 7/15 166/248 |
| 2017/0226411 | A1 | 8/2017 | Cannan et al. |
| 2018/0187536 | A1 | 7/2018 | Hefley |
| 2019/0225877 | A1 | 7/2019 | Roper et al. |
| 2019/0338625 | A1* | 11/2019 | Othman .............. E21B 43/2401 |
| 2020/0224520 | A1 | 7/2020 | Curlett |
| 2023/0020716 | A1 | 1/2023 | Mehrvand et al. |
| 2023/0020770 | A1 | 1/2023 | Alali et al. |
| 2023/0085175 | A1 | 3/2023 | Smalls et al. |
| 2023/0250714 | A1 | 8/2023 | Alali et al. |

FOREIGN PATENT DOCUMENTS

| | | |
|---|---|---|
| WO | WO 2010/025540 A1 | 3/2010 |
| WO | WO 2013/178826 A1 | 12/2013 |

OTHER PUBLICATIONS

Bera et al., Status of electromagnetic heating for enhanced heavy oil/bitumen recovery and future prospects: A review. Applied Energy. Aug. 1, 2015;151:206-26.

Chilingar et al., Electrobioremediation of soils contaminated with hydrocarbons and metals: progress report. Energy Sources. Feb. 1, 1997;19(2):129-46.

Deon et al., Geochemical interactions of Al2O3-based proppants with highly saline geothermal brines at simulated in situ temperature conditions. Geothermics. Jul. 1, 2013;47:53-60.

Harvey et al., Selective electric reservoir heating. Journal of Canadian Petroleum Technology. Jul. 1, 1979;18(03).

Hoversten et al., Monitoring hydraulic fracture volume using borehole to surface electromagnetic and conductive proppant. Geophysics. Jan. 1, 2021;86(1):E93-109.

Liang et al., A comprehensive review on proppant technologies. Petroleum. Mar. 1, 2016;2(1):26-39.

Zhou et al., The effects of temperature on supercritical CO2 induced fracture: An experimental study. Fuel. Jul. 1, 2019;247:126-34.

Gandossi et al, An overview of hydraulic fracturing and other formation stimulation technologies for shale gas production. JRC Science for Policy Report, 2015; 62 pages.

U.S. Appl. No. 18/939,494, filed Nov. 6, 2024, Alali et al.

U.S. Appl. No. 18/939,036, filed Nov. 6, 2024, Mehrvand et al.

* cited by examiner

ELECTRO-HYDROFRACTURING USING ELECTRICALLY CONDUCTIVE PROPPANTS AND RELATED METHODS

RELATED APPLICATIONS

This application is a Division of U.S. application Ser. No. 17/887,822, filed Aug. 15, 2022, which claims priority under 35 U.S.C. § 119(e) to U.S. Provisional Application No. 63/259,914, filed Aug. 16, 2021, each of which is incorporated herein by reference in its entirety for all purposes.

GOVERNMENT SPONSORSHIP

This invention was made with Government support under Contract No. DE-AR0001584 awarded by the U.S. Department of Energy. The Government has certain rights in the invention.

FIELD

Disclosed embodiments are related to electro-hydrofracturing using electrically conductive proppants and methods for hydraulic fracturing using electrically conductive proppants.

BACKGROUND

Geothermal or petroleum production well systems may require some degree of permeability to allow geo-fluid flow to the subsurface. Permeability is related to flow rate, heat recovery, petroleum recovery, and volume of production available from a given resource. Hence, permeability plays an important role in the economics of any given petroleum or geothermal reservoir.

Acid treatment and hydraulic fracturing of the reservoir are the main techniques used to increase permeability in today's market. These methods are related to Darcy's equation, which shows the relationship between geo-fluid production rate q and pressure differences between the reservoir and the well $(P_{res.}-P_{wfp.})$:

$$q = (2\pi kh/s\mu B) * (P_{res.} - P_{wfp.})$$

where, k is the permeability; h is the reservoir thickness; B is the formation volume factor; s is the skin factor; and μ is the fluid viscosity.

SUMMARY

In one aspect, a hydraulic fracturing composition is described, the composition comprising a transport fluid and a conductive proppant dispersed in the transport fluid, wherein an electrical conductivity of the hydraulic fracturing composition is greater than or equal to 100 S/m.

In another aspect, a system is described, the system comprising a hydraulic fracturing pump configured to inject a hydraulic fracturing composition into a reservoir, wherein the hydraulic fracturing composition comprises a transport fluid and a conductive proppant, wherein an electrical conductivity of the conductive proppant is greater than or equal to 100 S/m and two or more electrodes configured to apply a potential across at least a portion of the reservoir.

In another aspect, a method for fracturing a reservoir is described, the method comprising injecting a hydraulic fracturing composition comprising a transport fluid and a conductive proppant into the reservoir, wherein an electrical conductivity of the conductive proppant is greater than or equal to 100 S/m, applying a potential between a first portion of the reservoir and a second portion of the reservoir, and fracturing the reservoir between or proximate to the first portion and/or the second portion of the reservoir.

In yet another aspect, a method for characterizing a reservoir is described, the method comprising injecting a hydraulic fracturing composition comprising a transport fluid and a conductive proppant into the reservoir, wherein an electrical conductivity of the conductive proppant is greater than or equal to 100 S/m, applying electromagnetic radiation to the reservoir, sensing one or more signals related to the applied electromagnetic radiation, and determining one or more properties of the reservoir based at least in part on the one or more signals.

In yet another aspect, a system for characterizing a reservoir is described, the system comprising a hydraulic fracturing pump configured to inject a hydraulic fracturing composition into a reservoir, wherein the hydraulic fracturing composition comprises a transport fluid and a conductive proppant, wherein an electrical conductivity of the conductive proppant is greater than or equal to 100 S/m, two or more electrodes configured to apply a potential across at least a portion of the reservoir, a source of electromagnetic radiation, and a sensor configured to receive one or more signals related to the electromagnetic radiation.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 2A is a schematic illustration of a conductive proppant within a hydraulic fracturing composition, according to some embodiments;

FIG. 2B is a schematic illustration of a core-shell conductive proppant comprising a conductive shell with a non-conductive core, according to some embodiments;

DETAILED DESCRIPTION

Figure 1A:
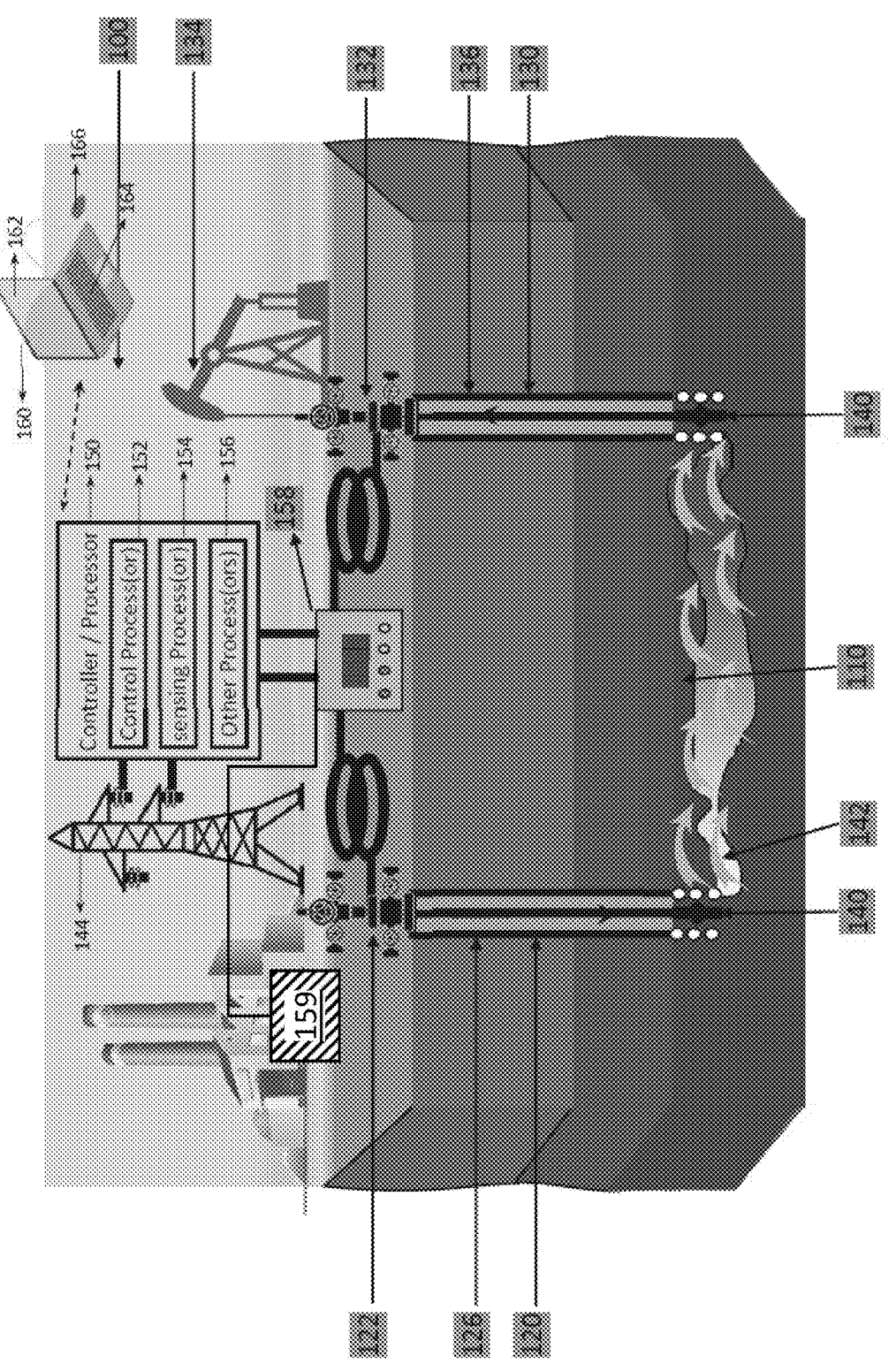
FIG. 1A is a schematic diagram showing a pair of wells with electrodes within in an arrangement where each electrode is connected to a pulsed power system and connected to a power source for providing a potential across a reservoir, according to some embodiments.

The present disclosure describes hydraulic fracturing compositions including a proppant that is electrically conductive. This disclosure also describes mapping a subterranean fracture network comprising one or more subterranean reservoirs.

Conventional hydraulic fracturing techniques include the use of acidic hydraulic fracturing compositions. Acidizing technology has advanced throughout the years, but the basic principle remains the same. With this technique, chemical stimulants, primarily hydrochloric and hydrofluoric acids at highly diluted concentrations, between 1 and 15%, injected into the reservoir rock create "wormholes" as the rocks dissolve from the acid treatment. This leads to a reduction in reservoir impedance and a boost in reservoir fluid flow rate. Since a corrosion inhibitor was developed to protect wells during application, acidizing techniques have experienced an increase in implementation of up to 400%. However, at high temperatures and in highly consolidated formations, acid penetration is limited, resulting in short conductive flow paths. Additionally, it is not possible to collect back all the injected treatment fluids, and thus, some of the acid will remain in the formation after the treatment is completed. Undissolved particles may build up in the well, resulting in a reduction in production flow. Acidizing remains less regulated than other techniques, though several states have proposed legislation and regulations.

Hydraulic fracturing is commonly used and creates long, open, conductive channels as fluids are pumped into the reservoir. This chemical mixture of water and a proppant (e.g., sand) is used to prevent cracks from closing after the pressure is released in the reservoir. In some instances, gels are used when the low viscosity of water makes it difficult for proppant transport. Gel residues are prone to stay in the formation and cause mineral precipitation leading to sand production in the well. While hydraulic fracturing is economically less costly than acidization, this technique is commonly associated with an increase in seismic activity near the wellbore region, rendering it disadvantageous and controversial in certain instances.

The effort required to treat reservoirs with acidized water, fracture sand, as well as the operation and maintenance challenges associated with these techniques and the costs of diesel generators in powering associated fluid pumps, renders existing techniques to increase reservoir permeability environmentally hazardous, expensive, and time-consuming. In addition to more typical fracturing techniques, electrical based fracturing methods may also be used to stimulate a reservoir. However, the Inventors have recognized that prior electrical based fracturing methods have tended to result in fracturing that is relatively localized adjacent to the electrodes used to implement electrical induced fracturing. A more environmentally friendly and efficient technique to increase the rock permeability of reservoirs is highly desirable.

The Inventors have recognized and appreciated that the fracturing ability of a hydraulic fracturing fluid used during an electrical based fracturing technique may be increased by the inclusion of one or more electrically conductive materials, such as additives and/or proppants, within the fracturing fluid. In contrast, existing techniques for hydraulic fracturing often include sand as a proppant in order to maintain open fractures. However, sand is electrically non-conductive and hence cannot contribute to the conductivity of the fracturing fluid or the conductivity of the reservoir as a whole. Thus, the Inventors discovered that by including one or more electrically conductive materials and/or additives within a fracturing fluid, the conductivity of the hydraulic fracturing fluid can be increased. Advantageously, by increasing the conductivity of the hydraulic fracturing fluid, the fracturing ability of the electrical stimulation can be increased. Without wishing to be bound by any particular theory, it is believed that increasing the conductivity of the hydraulic fracturing fluid with the inclusion of conductive proppants and/or other additives allows for increased Joule heating across a larger area of a formation when a potential is applied to the hydraulic fracturing fluid comprising the conductive proppant. By increasing the Joule heating of the fracturing fluid when a voltage is applied, more fractures and/or larger portions of fractures may be opened to a desired degree to stimulate reservoir production. In some embodiments, after heating, a cooling fluid of a lower temperature (e.g., less than or equal to 20° C.) than the heated hydraulic fracturing fluid may be injected into the reservoir. The contrast between heating and cooling may advantageously further facilitate fracturing, by facilitating rapid expansion and/or contraction of subterranean earth near the heated reservoir.

The Inventors have also recognized that it may be difficult to determine where to apply electro-hydraulic fracturing within a reservoir using conventional characterization techniques due to the difficulty in imaging the different features of a reservoir. Accordingly, the Inventors have also appreciated that hydraulic fracturing fluid including a conductive material, such as a proppant, can be used to map a fracture network within and/or proximate to a reservoir. As the hydraulic fracturing composition comprising the conductive material is injected into a reservoir, some portions of the reservoir, and the resulting formed fractures, may be infiltrated by the hydraulic fracturing composition, while other portions of the reservoir and/or the formed fractures may not be infiltrated, or may be infiltrated to a lesser degree, by the hydraulic fracturing fluid composition (or are filled with an amount of the hydraulic fracturing fluid composition that is less than other portions of the fracture network). Because the fluid composition comprises an electrically conductive material, a conductivity contrast may exist between portions of the fracture network depending on the amount of the hydraulic fracturing composition that is contained within that portion of the fracture network. Advantageously, this contrast may be used to map the fracture network, for example, by applying electromagnetic radiation (EMR) from the surface to the subterranean fracture network, wherein at least some portions of the fracture network are permeated by the hydraulic fracturing composition comprising the conductive proppant. These electromagnetic measurements can be made from the surface and/or from nearby wellbores. While this information may be used in other processes, in some embodiments, this information may be used in guiding where and/or how electrohydraulic fracturing using the conductive hydraulic fracturing fluid is applied to a reservoir. Details regarding mapping a fracture network based on a conductivity contrast are also described below.

As mentioned above, in some embodiments, a hydraulic fracturing composition is described comprising one or more electrically conductive materials. In some embodiments, this may include the use of conductive proppants within the hydraulic fracturing fluid. The conductivity of the proppant may increase the conductivity of the hydraulic fracturing composition (e.g., a fluid, a slurry, a suspension). A variety of proppants are suitable, so long as the proppants comprise of an electrically conductive material. Non-limiting examples of conductive proppant include ceramic particles (e.g., electrically conductive ceramic particles), coated particles (e.g., particles coated with a conductive material such as a conductive metal or other conductive material, conductive composite particles where the composite particles include a non-conductive and conductive material), copolymers and resin, carbon particles (e.g., carbon black, acetylene black, petroleum coke, graphite, Carbolite), and metal particles (e.g., stainless steel shot). Additional non-limiting examples of conductive proppants include porous or sintered metals, such as aluminum or aluminum alloys. Combinations of these proppants are also possible (e.g., petroleum coke and another proppant).

In some embodiments, the hydraulic fracturing compositions may comprise a conductive proppant and a non-conductive proppant. For example, in some embodiments, the composition comprises a conductive proppant, such as petroleum coke, and a non-conductive proppant, such as sand. Advantageously, mixing different types of conductive proppants with non-conductive proppants may adjust properties of the other proppant and/or of the hydraulic fracturing composition, such as by increasing fracture permeability and/or hydraulic conductivity to a desired level. In some such embodiments, at least 10 wt %, at least 20 wt %, at least 40 wt %, at least 50 wt %, or at least 60 wt % of the total proppant is non-conductive proppant relative to the total amount of all proppants present in the hydraulic fracturing composition. By way of illustration and not limitation, if the total amount of all proppants (e.g., conductive proppant and non-conductive proppant) is 100 kg, then 50 kg (i.e. 50 wt %) of the proppant may be sand and the balance (i.e., 50 kg) may be conductive proppant, such as petroleum coke. Of course, those skilled in the art, in light of the present disclosure, will be capable of determining other appropriate amounts of non-conductive proppant and conductive proppant based on, at least in part, the desired conductivity of the composition and/or the fracture. Of course, however, it should be understood that for some other embodiments, the composition comprises only conductive proppant.

For some embodiments, the conductive proppant comprises an electrically conductive portion and an electrically non-conductive portion. For example, the conductive proppant can be a core-shell material in which the exterior shell comprises an electrically conductive material (e.g., a metallic coating) and the interior core comprises an electrically non-conductive material (e.g., silica). In some embodiments, the electrically conductive portion and the electrically non-conductive portion are in a mixed arrangement, wherein portions of the electrically conductive portion are intermingled with one another. For example, particles of a conductive proppant may be mixed with separate particles of a non-conductive proppant. Other configurations of the electrically conductive portion and the electrically non-conductive portion are possible. Of course, in other embodiments, the conductive proppant comprises only an electrically conductive portion, such that the entirety of the conductive proppant comprises an electrically conductive material.

In embodiments in which a conductive hydraulic fracturing fluid includes a proppant including a portion that is non-conductive, the electrically non-conductive proppant material may correspond to any appropriate non-conductive proppant material compatible with the processes described herein. Non-limiting examples of electrically non-conductive materials include alumina ($Al_2O_3$), silica ($SiO_2$), and/or polymers, such as copolymers (e.g., resin $C_{21}H_{25}ClO_5$). In some embodiments, the electrically non-conductive material is coated or mixed with an electrically conductive material (e.g., a metallic coating, a conductive carbon material) as noted above.

In some embodiments, the conductive proppant comprises an electrically conductive material. In some embodiments, the conductivity of the electrically conductive material is greater than or equal to $1\times10^2$ S/m, greater than or equal to $5\times10^2$ S/m, greater than or equal to $1\times10^3$ S/m, greater than or equal to $5\times10^3$ S/m, greater than or equal to $1\times10^4$ S/m, greater than or equal to $1\times10^5$ S/m, greater than or equal to $1\times10^6$ S/m, or greater than or equal to $1\times10^7$ S/m. In some embodiments, the conductivity of the electrically conductive material is less than or equal to $1\times10^7$ S/m, less than or equal to $1\times10^6$ S/m, less than or equal to $1\times10^5$ S/m, less than or equal to $1\times10^4$ S/m, less than or equal to $5\times10^3$ S/m, less than or equal to $1\times10^3$ S/m, less than or equal to $5\times10^2$ S/m, or less than or equal to $1\times10^2$ S/m. Combinations of the foregoing ranges are also contemplated (e.g., greater than or equal to $1\times10^2$ S/m and less than or equal to $1\times10^7$ S/m). Other ranges are possible as this disclosure is not so limited.

In some embodiments, the hydraulic fracturing composition provides conductivity to a hydraulic fracturing fluid comprising the composition. In some embodiments, the conductivity of the hydraulic fracturing fluid is greater than or equal to 100 S/m, greater than or equal 150 S/m, greater than or equal 200 S/m, greater than or equal 250 S/m, greater than or equal 300 S/m, greater than or equal 500 S/m, greater than or equal 750 S/m, greater than or equal 1,000 S/m, greater than or equal 1,250 S/m, greater than or equal 1,500 S/m, greater than or equal 1,750 S/m, greater than or equal 2,000 S/m, greater than or equal 2,500 S/m, greater than or equal 3,000 S/m, greater than or equal 3,500 S/m, greater than or equal 4,000 S/m, greater than or equal 4,500 S/m, or greater than or equal 5,000 S/m. In some embodiments, the conductivity of the hydraulic fracturing fluid is less than or equal to 5,000 S/m, less than or equal to 4,500 S/m, less than or equal to 4,000 S/m, less than or equal to 3,500 S/m, less than or equal to 3,000 S/m, less than or equal to 2,500 S/m, less than or equal to 2,000 S/m, less than or equal to 1,750

S/m, less than or equal to 1,500 S/m, less than or equal to 1,250 S/m, less than or equal to 1,000 S/m, less than or equal to 750 S/m, less than or equal to 500 S/m, less than or equal to 300 S/m, less than or equal to 250 S/m, less than or equal to 200 S/m, less than or equal to 150 S/m, or less than or equal to 100 S/m. Combinations of the foregoing ranges are also possible (e.g., greater than or equal to 2,000 S/m and less than or equal to 5,000 S/m). Other ranges are possible as this disclosure is not so limited.

The conductive proppant particles suspended within a hydraulic fracturing fluid may have a particular size or dimension. In some cases, the particles may preferably be spheres with relatively uniform diameters. However, depending on the embodiment, different shapes and/or distribution of sizes may also be used. In some embodiments, an average maximum transverse dimension of the conductive proppant is greater than or equal to 1 μm, greater than or equal to 2 μm, greater than or equal to 3 μm, greater than or equal to 4 μm, greater than or equal to 5 μm, greater than or equal to 7 μm, greater than or equal to 10 μm, greater than or equal to 15 μm, greater than or equal to 20 μm, greater than or equal to 25 μm, greater than or equal to 30 μm, greater than or equal to 40 μm, greater than or equal to 50 m, greater than or equal to 100 m, greater than or equal to 200 μm, greater than or equal to 300 μm, greater than or equal to 400 m, greater than or equal to 500 m, greater than or equal to 600 m, greater than or equal to 700 lam, greater than or equal to 800 lam, greater than or equal to 900 lam, or greater than or equal to 1,000 μm. In some embodiments, an average maximum transverse dimension of the conductive proppant is less than or equal to 1,000 μm, less than or equal to 900 μm, less than or equal to 800 μm, less than or equal to 700 μm, less than or equal to 600 μm, less than or equal to 500 μm, less than or equal to 400 μm, less than or equal to 300 μm, less than or equal to 200 μm, less than or equal to 100 μm, less than or equal to 50 μm, less than or equal to 40 μm, less than or equal to 30 μm, less than or equal to 25 μm, less than or equal to 20 μm, less than or equal to 15 μm, less than or equal to 10 μm, less than or equal to 7 μm, less than or equal to 5 μm, less than or equal to 4 μm, less than or equal to 3 μm, less than or equal to 2 μm, or less than or equal to 1 μm. Combinations of the foregoing ranges are also possible (e.g., greater than or equal to 1 μm and less than or equal to 1,000 μm). Other ranges are possible.

For some embodiments, the conductive proppant within a hydraulic fracturing fluid as described herein may have a particular porosity (i.e., the conductive proppant is a porous conductive proppant). In some embodiments, the conductive proppant has a porosity of greater than or equal to 10%, greater than or equal to 15%, greater than or equal to 20%, greater than or equal to 25%, greater than or equal to 30%, greater than or equal to 40%, greater than or equal to 50%, greater than or equal to 60%, or greater than or equal to 70%. In some embodiments, the conductive proppant has a porosity of less than or equal to 70%, less than or equal to 60%, less than or equal to 50%, less than or equal to 40%, less than or equal to 30%, less than or equal to 25%, less than or equal to 20%, less than or equal to 15%, or less than or equal to 10%. Combinations of the foregoing ranges are also possible (e.g., greater than or equal to 10% and less than or equal to 70%). Other ranges are possible.

In some embodiments, the conductive proppant within a hydraulic fracturing fluid as described herein has a particular average pore size. In some embodiments, the conductive proppant has an average pore diameter of greater than or equal to 50 nm, greater than or equal to 100 nm, greater than or equal to 200 nm, greater than or equal to 250 nm, greater than or equal to 500 nm, greater than or equal to 750, greater than or equal to 1 μm, greater than or equal to 5 μm, greater than or equal to 10 μm, greater than or equal to 20 μm, greater than or equal to 25 μm, greater than or equal to 50 μm, greater than or equal to 100 μm, greater than or equal to 250 μm, greater than or equal to 500 μm, greater than or equal to 750 μm, or greater than or equal to 1,000 μm. Combinations of the foregoing ranges are also possible (e.g., greater than or equal to 50 nm and less than or equal to 1,000 μm). Other ranges are possible as this disclosure is not so limited.

In some embodiments, the conductive proppant within a hydraulic fracturing fluid as described herein can withstand hydraulic fracturing pressures without significant damage to the conductive proppant (e.g., cracking, breaking, shattering, a loss of electrical conductivity). In some embodiments, the conductive particles are rated to withstand greater than or equal to 30 MPa, greater than or equal to 50 MPa, greater than or equal to 75 MPa, greater than or equal to 100 MPa, greater than or equal to 125 MPa, or greater than or equal to 150 MPa. In some embodiments, the conductive particles are rated to withstand less than or equal to 150 MPa, less than or equal to 125 MPa, less than or equal to 100 MPa, less than or equal to 75 MPa, less than or equal to 50 MPa, or less than or equal to 30 MPa. Combinations of the foregoing ranges are also possible (e.g., greater than or equal to 30 MPa and less than or equal to 150 MPa). Of course, other ranges are possible as this disclosure is not so limited. A suitable test for determining the pressure a conductive proppant can withstand is ISO 13503-2.

In some embodiments, the conductive proppant has a particular tensile strength. In some embodiments, the tensile strength of the conductive proppant is greater than or equal to 10,000 psi, greater than or equal to 20,000 psi, greater than or equal to 50,000 psi, greater than or equal to 90,000 psi, or greater than or equal to 100,000 psi. In some embodiments, the tensile strength of the conductive proppant is less than or equal to 100,000 psi, less than or equal to 90,000 psi, less than or equal to 50,000 psi, less than or equal to 20,000 psi, or less than or equal to 10,000 psi. Combinations of the above-referenced ranges are also possible (e.g., greater than or equal to 10,000 psi or less than or equal to 100,000 psi). Other ranges are possible.

In some embodiments, a hydraulic fracturing composition comprises a transport fluid. In some embodiments, a conductive proppant is dispersed and/or suspended in the transport fluid. The transport fluid may dissolve or suspend one or more conductive proppants and may deliver the conductive proppant to a reservoir or fractures within or proximate to the reservoir or within the fracture network formed by the fracturing composition. A variety of fluids may be used as a transport' fluid. Non-limiting examples of a transport fluid include water (e.g., freshwater, brine), compressed gas (e.g., liquefied petroleum gas), or carbon dioxide (e.g., supercritical carbon dioxide). In some embodiments, the transport fluid comprises a polymer and/or a viscoelastic surfactant. In some embodiments, the transport fluid comprises a borate, zirconium, and/or aluminum compound, which may promote crosslinking within the transport fluid, which can increase the viscosity of the transport fluid. In some embodiments, the transport fluid comprises a hydrocarbon (e.g., an oil, diesel, liquified petroleum) and/or an acid.

In some embodiments, the conductive proppant is present within the transport fluid (e.g., suspended). In some embodiments, a weight percentage of conductive proppant within transport fluid is greater than or equal to 1%, greater than or equal to 2%, greater than or equal to 3%, greater than or equal to 5%, greater than or equal to 10%, greater than or equal to 15%, greater than or equal to 20%, greater than or equal to 25%, greater than or equal to 30%, greater than or equal to 40%, greater than or equal to 50%, or greater than or equal to 60%. In some embodiments, a weight percentage of the conductive proppant within the transport fluid is less than or equal to 60%, less than or equal to 50%, less than or equal to 40%, less than or equal to 30%, less than or equal to 25%, less than or equal to 20%, less than or equal to 15%, less than or equal to 10%, less than or equal to 5%, less than or equal to 3%, less than or equal to 2%, or less than or equal to 1%. Combinations of the foregoing ranges also possible (e.g., greater than or equal to 1% and less than or equal to 60%). Of course, other ranges are possible as this disclosure is not so limited.

In some embodiments, the hydraulic fracturing compositions described herein comprise a thickening agent. The thickening agent can alter the viscosity of the transport fluid (e.g., increasing its viscosity) as desired for a particular reservoir. In some embodiments, the thickening agent comprises a salt, such as potassium chloride (KCl). In some embodiments, the thickening agent comprises a polymer. Non-limiting examples of suitable polymers include gum ghatti and/or guar gum.

The transport fluid is suitable for conveying conductive proppant under conditions for subterranean fracturing, which may have relatively high temperatures and pressures. For example, the transport fluid may be configured such that is does not undergo a phase change within a range of temperatures and/or pressures, and hence may be heated and/or cooled. In some embodiments, the transport fluid is heated to a particular temperature during use. The transport fluid may be selected such that it does not change phases (e.g., from liquid to a gas) during use in some embodiments. In some embodiments, the temperature of the transport fluid is greater than or equal to 40° C., greater than or equal to 50° C., greater than or equal to 100° C., greater than or equal to 200° C., greater than or equal to 250° C., greater than or equal to 500° C., greater than or equal to 750° C., greater than or equal to 900° C., or greater than or equal to 1,000° C. In some embodiments, the temperature is heated to a temperature of less than or equal to 1,000° C., less than or equal to 900° C., less than or equal to 750° C., less than or equal to 500° C., less than or equal to 250° C., less than or equal to 200° C., less than or equal to 100° C., less than or equal to 50° C., or less than or equal to 40° C. Combinations of the above-referenced ranges are also possible (e.g., greater than or equal to 40° C. and less than or equal to 1000° C.). Other ranges are possible.

In some embodiments, an electric pulse can be administered via a pulsed power device (e.g., an AC current). In some embodiments, the electric pulse has a voltage of greater than or equal to 1 V, greater than or equal to 5 V, greater than or equal to 10 V, greater than or equal to 50 V, greater than or equal to 100 V, greater than or equal to 500 V, greater than or equal to 1 kV, greater than or equal to 5 kV, greater than or equal to 10 kV, greater than or equal to 50 kV, or greater than or equal to 100 kV. In some embodiments, the electric pulse has a voltage of less than or equal to 100 kV, less than or equal to 50 kV, less than or equal to 10 kV, less than or equal to 5 kV, less than or equal to 1 kV, less than or equal to 500 V, less than or equal to 100 V, less than or equal to 50 V, less than or equal to 10 V, less than or equal to 5 V, or less than or equal to 1 V. Combinations of the foregoing ranges are also possible (e.g., greater than or equal to 1 V and less than or equal to 100 kV). In another embodiment, the voltage may be between or equal to 1 kV and 100 kV. Other ranges are possible as this disclosure is not so limited.

In some embodiments, a pulse power device administers an electric pulse with a particular amount of power. In some embodiments, the electric pulse has a power of greater than or equal to 1 MW, greater than or equal to 5 MW, greater than or equal to 10 MW, greater than or equal to 50 MW, greater than or equal to 100 MW, greater than or equal to 500 MW, or greater than or equal to 1,000 MW. In some embodiments, the electric pulse has a power of less than or equal to 1,000 MW, less than or equal to 500 MW, less than or equal to 100 MW, less than or equal to 50 MW, less than or equal to 10 MW, less than or equal to 5 MW, or less than or equal to 1 MW. Combinations of the above-referenced ranges are also possible (e.g., greater than or equal to 1 MW and less than or equal to 1,000 MW). Of course, other ranges are possible as this disclosure is not so limited.

In some embodiments, an electric current can be administered via a DC power device. In some embodiments, the electric current has a voltage of greater than or equal to 1 V, greater than or equal to 5 V, greater than or equal to 10 V, greater than or equal to 50 V, greater than or equal to 100 V, greater than or equal to 500 V, greater than or equal to 1 kV, greater than or equal to 5 kV, greater than or equal to 10 kV, greater than or equal to 50 kV, or greater than or equal to 100 kV. In some embodiments, the electric current has a voltage of less than or equal to 100 kV, less than or equal to 50 kV, less than or equal to 10 kV, less than or equal to 5 kV, less than or equal to 1 kV, less than or equal to 500 V, less than or equal to 100 V, less than or equal to 50 V, less than or equal to 10 V, less than or equal to 5 V, or less than or equal to 1 V. Combinations of the foregoing ranges are also possible (e.g., greater than or equal to 1 V and less than or equal to 100 kV). In another embodiment, the voltage may be between or equal to 1 kV and 100 kV. Other ranges are possible as this disclosure is not so limited.

In some embodiments, a DC power device administers an electric current with a particular amount of power. In some embodiments, the electric current has a power of greater than or equal to 1 MW, greater than or equal to 5 MW, greater than or equal to 10 MW, greater than or equal to 50 MW, greater than or equal to 100 MW, greater than or equal to 500 MW, or greater than or equal to 1,000 MW. In some embodiments, the electric current has a power of less than or equal to 1,000 MW, less than or equal to 500 MW, less than or equal to 100 MW, less than or equal to 50 MW, less than or equal to 10 MW, less than or equal to 5 MW, or less than or equal to 1 MW. Combinations of the above-referenced ranges are also possible (e.g., greater than or equal to 1 MW and less than or equal to 1,000 MW). Of course, other ranges are possible as this disclosure is not so limited.

Some embodiments are related to a system for providing a hydraulic fracturing composition to a subterranean reservoir. In some such embodiments, the system comprises a pump configured to inject the hydraulic fracturing composition into the reservoir, wherein the hydraulic fracturing composition comprises a transport fluid and a conductive proppant. The system may also include, two or more electrodes positioned in two or more spaced apart bore holes configured to apply a potential across at least a portion of the reservoir and/or a proppant tank containing the hydraulic fracturing composition, where the proppant tank is in fluidic communication with the hydraulic fracturing pump.

The two or more electrodes may each be any suitable electrode for applying a potential across the reservoir. In some embodiments, the two or more electrodes are configured to apply a voltage potential between a first portion of the reservoir and a second portion of the reservoir. In some such embodiments, the applied voltage potential heats the reservoir (e.g., via Joule heating) due to the flow of current between the two or more electrodes located in at least the first and second portions of the reservoir. Non-limiting examples of appropriate electrodes may include titanium, aluminum, copper, and alloys and/or compounds thereof. In one embodiment, an electrode may comprise cobalt beryllium copper.

In some embodiments, a fracture network associated with one or more reservoirs can be mapped or imaged. As described above and elsewhere herein, the conductive hydraulic fracturing fluids disclosed herein may penetrate portions of a reservoir and any fractures associated with the reservoir. In some embodiments, as the hydraulic fracturing composition, comprising a conductive material, is pumped into a reservoir, it may create new fractures and/or cause existing fractures to propagate. In some such embodiments, the conductive material may infiltrate at least some portions of the fractures while not penetrating at least some other portions of the fracture. The difference in the amount of the conductive material (or the hydraulic fracturing composition comprising the conductive material) that penetrates different portions of the reservoir and/or associated fracture network may allow for the characterization of the fracture network. Advantageously, the fracture network may be characterized from a position above a subterranean reservoir, for example, from a position on the surface of a drill site. In some embodiments, electromagnetic radiation is applied to the reservoir, and one or more resulting signals related to the applied electromagnetic radiation may be received from the reservoir. These signals may be used to determine one or more properties of the reservoir and/or the associated fracture network can be determined based, at least in part, on the one or more signals.

In some embodiments, the two or more electrodes may apply a voltage to the reservoir or otherwise provide current to the reservoir (e.g., fracturing fluid within the reservoir). In some such embodiments, a pulsed power system may be used. The pulsed power system is based on the principle of parallel charge and parallel discharge of very low inductance strip line capacitors through suitable spark gap systems which can handle peak currents and electrical stresses. It can have at least 110 V, at least 208 V, at least 230 V, at least 480 V, or higher voltage alternating current as input power. In some embodiments, it may further comprise a filter and/or a DC rectifier to convert AC to DC, as well as current controls and/or chargers to store energy in energy storage devices such as capacitor banks.

In some embodiments, a DC current is applied across the two or more electrodes. In some such embodiments, the DC current is applied after a pulse AC current. Advantageously, applying a DC current may further fracture the reservoir relative to applying only an AC current.

As used herein, a well may refer to a borehole extending into a geological feature. For example, a borehole may extend through one or more strata disposed between an upper ground surface of a formation and a reservoir that the bore hole is used to access. This may include applications such as, petroleum producing reservoirs (e.g., oil and gas producing reservoirs); water reservoirs; geothermal reservoirs including Enhanced Geothermal Systems (EGS), carbon sequestration reservoir, in-situ mineral mining reservoir; and/or any other appropriate geological feature that a borehole may be formed in.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1A shows a schematic illustration of a generalized arrangement 100 for stimulating a reservoir with an electrically conductive hydraulic fracturing composition (e.g., using a hydraulic fracturing fluid comprising one or more conductive materials). In the figure, a subsurface reservoir 110 is positioned between each of drilled wells 120 and 130 (e.g., two or more spaced apart wells). The system may be configured to perform an electrohydraulic fracturing process such as a low-frequency electrical treatment, a pulsed-power treatment, and/or another appropriate electrohydraulic fracturing process where a voltage potential is applied to the reservoir formation between the two or more wells as described in more detail below and elsewhere herein. The depicted wells may be petroleum-producing units (e.g. gas and/or oil) that tap a reservoir that may contain petroleum mixed with ground water (e.g., fresh water, bine). Of course, this process may be applied to other appropriate wells too (e.g., geothermal wells associated with thermoelectric production, wells associated with carbon sequestration, wells associated with mineral recovery and mining, and/or any other appropriate application). Wells 120 and 130 include a respective head assembly 122 and 132 that can be arranged to include a pump 134 along with various valves and connections, such as particular structures residing within casings 126 and 136 that facilitate petroleum production or any other desired process associated with the wells as described herein. At the depth of the reservoir 110, each of casings 126 and 136 may include perforations extending from an interior of the well to the well exterior through the casings, as shown in the figure, to allow fluid communication between the well interior and the reservoir through the casings. The casings and perforations may be configured such that the conductive hydraulic fracturing fluids disclosed herein may flow through the one or more perforated casings located at a desired position within a reservoir.

The permeability of the reservoir is a function of the rate and degree of petroleum production, or, in the case of a geothermal well, the recharge rate of circulated geo-fluid (e.g., water, brine, petroleum-water/brine mixtures, etc.). While not shown in the figure, a conductive hydraulic fracturing fluid as described herein can be injected via each of respective well heads 122 and 132 to assist in generating increased permeability in the reservoir. As shown in FIG. 1A, after pumping a conductive hydraulic fracturing fluid into the reservoir 110, the system can employ electricity provided from a power source 144, such as the power distribution source shown in the figure, a local power generator, one or more batteries, and/or any other appropriate power source, to increase permeability in the space of the reservoir 110 between wells 120 and 130. The electric connection may be made via each respective well head assembly 122 and 132 using appropriate wires and conduits that extend within the well and/or energize the casing. In some embodiments, the electrodes 140 that may be electrically connected to the power source and used to energize the reservoir may be localized to the depth containing the reservoir and the leading portion of the conductor may be an insulated cable. This may be done by electrically insulating the distal energized casings from a proximal portion of the casings lining the wells. By localizing the location where a voltage and corresponding current is applied to a reservoir at a sufficient depth, the risk of current flowing to the surface in any significant quantity may be mitigated. Hence, as shown in the figure, the localized current (arrows 142) flows between the wells 120 and 130 within the reservoir 110. Without wishing to be bound by theory, the current flowing between the electrodes may cause physical changes to occur within the matrix of sand, clay, rock, and other compounds, in a manner that increases permeability. For example, in some embodiments, the current flowing between the wells may result in Joule heating of the reservoir where the current causes heat to be generated in the reservoir causing the local temperature of the reservoir in portions of the reservoir where the current is passed to increase. This rapid heating may cause increased fracturing within the reservoir. Additionally, after heating, a cool fluid with a temperature less than the heated reservoir, such as liquid water, brine, or other appropriate fluid, may be introduced to the reservoir to induce thermal shock due to rapid cooling within the reservoir which may induce further fracturing of the reservoir in some embodiments.

As described in more detail elsewhere herein, one or more appropriate controllers 150 may be operatively connected to the one or more power source(s) 144, well heads 134, and/or any other appropriate component of the electrohydraulic fracturing systems disclosed herein. In some embodiments, the one or more controllers may include a pulsed power system 158, low-frequency electrical treatment system, or other appropriate system configured to apply a desired type of electrical stimulation to a reservoir. In some embodiments, the one or more controllers may include or be associated with a DC power source 159, which may provide Joule heating to the conductive proppant and/or the reservoir. The controller may include one or more processors 152 and associated memory that includes processor executable instructions that when executed by the one or more processors cause the various components of the system to perform any of the processes disclosed herein. The one or more processors 152 can also interconnect with various sensors including one or more of any of current and voltage probes, temperature sensors, pressure sensors, electromagnetic resonance (EMR) sensors, flow sensors, and/or any other appropriate sensor. This connection may either be a direct connection and/or one or more sensor processors 154 may be connected to the one or more processors 152. Depending on the specific sensor, the different sensors may be located within the well(s) or in line with the power system to measure flow of current between wells, voltage potential applied between the wells, and/or other parameters, such as flow rate of the fluid and/or an EMR signal received after emitting an EMR signal from a signal generator. These and other processes 156 can be instantiated within a standalone processing arrangement-such as an FPGA, and/or can be connected via interfaces with a general purpose computing environment 160. Such can include a PC, server, laptop, tablet, smartphone, or other computing device having an interface, for example, a display/touchscreen 162, keyboard 164 and/or mouse 166. Appropriate wired and/or wireless networking links can also be provided as appropriate, and in accordance with those of ordinary skill in the art.

Figure 1B:
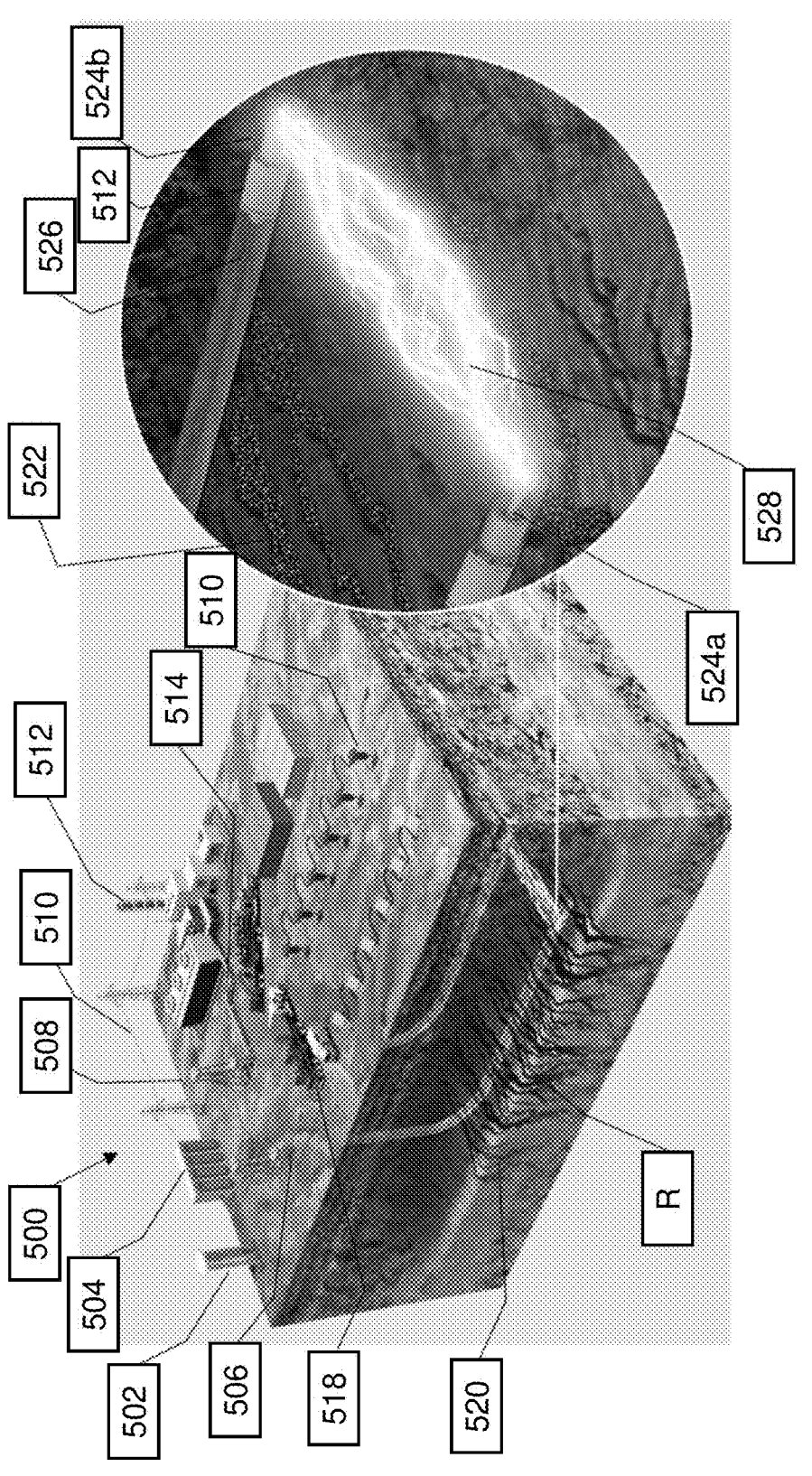
FIG. 1B is a schematic diagram of a hydraulic fracturing system, according to some embodiments.

FIG. 1B is an overview of a system 500 for hydraulic fracturing, electrical stimulation, and hydro-electric fracturing. In some embodiments, a first well is drilled into an enhanced geothermal system (EGS) reservoir R, e.g., hard dry rock. The first well 506 (also referred to as wellbore) can be any type of well, such as a production well, an injection well, such as a vertical or horizontal injection well, or the like. In this example, the first well 502 is drilled through one or more sedimentary layers into a target reservoir area R. The target reservoir area R may have little or no in-situ brine as can be found in hot dry rocks in enhanced geothermal systems and/or a low water saturation, such as below 20% water saturation as can be found in hydrocarbon saturated tight/low permeability clastic reservoirs. In such conditions, electrical stimulation may be ineffective, and the present combined techniques of hydraulic fracturing and electrical stimulation may increase permeability. Natural hydraulic fractures may exist in the target reservoir area R and may be injected with a combination of a fluid (e.g., electrically conductive fluid, such as a brine) and/or electrically conductive proppant 522 (e.g., injected fluid/proppant mixture), may introduced at a high pressure by hydraulic fracturing pump 518, and hydraulic fracturing operations are conducted in order to stimulate the re-opening of existing natural fractures 520 and the initiation and propagation of new hydraulic fractures (also referred to as artificial fractures) away from the first well. The proppant may be any appropriate proppant as disclosed herein. Also, the fluid may be an electrically conductive fluid, such as brine.

The extent and magnitude of existing natural fractures 520 and new hydraulic fractures may be monitored and mapped by one or more receivers 510. The receivers 510 can be any combination of magnetotelluric, micro-seismic, and/or electromagnetic imaging receivers capable of monitoring, imaging, and mapping existing natural fractures and new hydraulic fractures (collectively referred to as "fracture network") in the target reservoir area R. The receivers can monitor, image, and map the fracture network concurrently with the hydraulic fracturing, after hydraulic fracturing is complete, or some combination thereof. The number, amount, type of receivers, and measurements taken can vary according to various aspects of the disclosure and according to the geography of a site and the particular system. Additionally or alternatively, monitoring, imaging, and mapping can be conducted within the first well by logging, such as density/neutron, and/or borehole imaging methods, such as acoustic imaging, after hydraulic fracturing. Mapping of the fracture network can also show which areas of the first well and target reservoir area R with limited hydraulic fracturing initiation and development can benefit from additional targeted stimulation. In this example, the new fractures near the toe of the well are assumed to be minor in comparison to the existing natural fractures thus making additional electrical stimulation in this area advantageous. In addition to the example shown, this method can also be applied to: fields with existing wells or to fields where additional wells are not planned, in that subsequent electrical stimulation steps are conducted between at least two wells.

Time-lapse resistivity imaging, such as magnetotellurics, may be coupled with micro-seismic events to better characterize and image the fracture network in some embodiments. Resistivity imaging methods can detect the contrast between highly conductive fluid filled fractures and the highly resistive reservoir formation and provide additional information on fracture connectivity and aperture in some embodiments.

In some embodiments, at least one second well 508 may be drilled. The at least one second well (also referred to as wellbore) can be any type of well, such as a production well, an injection well, such as a vertical or horizontal injection well, or the like. The at least one second well can also include a plurality of wells, according to one or more embodiments.

The at least one second well may be targeted and drilled such that it intersects the fracture network created by hydraulic fracturing conducted. In some examples, several wells can be drilled and target depending on the fracture network generated. One or more electrodes 524a, b of opposite charges are lowered into the first well and second well. This may Be accomplished using high voltage cables 526 having the electrode at one end and being interconnected to one or both of the pulsed power device 502 and/or DC power supply 504 positioned at the surface. In one example, the electrode 524a can be an anode and electrode 524b can be a cathode, the respective polarities can be reversed according to various embodiments. The electrodes 524a and 524b can be moved to one or more additional electrode positions within the wells by feeding or withdrawing length of high voltage cables 526 accordingly. In other examples, a plurality of electrodes 524a, b can be lowered into each of the respective wells and to achieve simultaneous positioning of the several electrode positions.

The electrodes can be attached to a bottom-hole-assembly stimulation tool 530, where the cable is connected to the electrode inside the tool 530 using a connector. The tool 530 enclosure can isolate the electrode from the high pressure and electrically conductive environment of the borehole. The tool 530 can move inside the wellbore to different stimulation zones and electrode positions using mechanisms such as well tractors. Nonconductive insulating packers can be set above and below or left and right sides of the electrode to isolate the operation zone electrically and hydraulically from the rest of the borehole.

In some embodiments, the pulsed power device 502 (powered by, for example, electricity line 510, which can receive power from the grid or a generator) rapidly release a predetermined electrical pulse, or electric shock, of electrical energy. The predetermined pulse, or electric shock, can be delivered for a predetermined amount of time, or can be delivered until the electrical impedance between the electrodes 524a, breaches a minimum, indicating peak electrical fracturing has been achieved. The predetermined pulse can be delivered at up to 1,000 Megawatts to deliver up to 120 kJ of energy, though any appropriate power and/or energy may be used depending on the embodiment.

The electrical pulses may cause uneven heating, sudden expansion of minerals, and vaporization of pore fluid which can result in up to an eight order of magnitude increase in rock permeability under laboratory conditions. Differential thermal expansion of the fluid compared to the reservoir rock may induce micro-fracture propagation due to tensile failure, adding additional permeability to the target zone. In particular, the electrical pulse can increase permeability in fractures toward the toe of each well, which will counter the pressure drop in the target reservoir area R, and thus prevent short circuiting. The DC power device 504 with a voltage up to 100 kV and a power up to 1000 MW, or other appropriate power parameter, (powered by, for example, electricity line 510, which can receive power from the grid or a generator) may be used to joule heat the mixture of conductive fluid and proppant in the fracture network. Electrical stimulation may advantageously reduce breakdown pressure needed for hydraulic fracturing by 5-50% and Joule heating of the reservoir area (2-8× temperature increase or other appropriate temperature increase) represented conceptually as heating zone 528, to induce thermal expansion and micro-fracture propagation. Electrical stimulation also allows for targeted stimulation to enhance fracture development in areas identified as having limited hydraulic fracture propagation (represented by electrode pairs 524a, b).

Temperature increase will be dependent on exemplary parameters such as the reservoir properties as well as the voltage and power applied. In the example where coke is the proppant, the temperature can be heated to 800 C as the coke can experience a reduction of electrical conductivity above this temperature.

Cold water may be injected into the first well 306. Because the target reservoir area R was heated, in some examples at 2× to 8× temperature increase, during electrical stimulation described above, the injection of surface temperature, water which is significantly cooler than reservoir temperature (in this the injected fluid may be 20 C at the surface, but is highly variable depending on the particular embodiment), may result in quenching of the heated reservoir. Rapid thermal gradient and resulting stresses can cause the initiation and propagation of micro-fractures in the direction of fluid flow in the heated region 528. The hydraulic fracturing conducted can optionally be repeated one or more times.

The high temperature differential between the superheated fracture surface and the colder injection water may cause "thermal shock" of the reservoir, which can lower the reservoir breakdown pressure by up to 400% and increase permeability by up to four times in some embodiments. Applying EHF increases the fracture number and volume within a given region of reservoir rock as compared to hydraulic fracturing alone.

Applying HEF (hydro-electric fracturing) may increase the fracture number and volume within a given region of reservoir rock than hydraulic fracturing alone. In the case of EGS, the injected water may be heated to reservoir temperature as it is circulated through the fracture network toward the producer well. The hot water may be pumped from the well to geothermal power plant 512 via pipeline 514 and utilized for power generation before being reinjected into well another well hydraulically connected to the producer well via the induced fracture network.

Figure 2C:
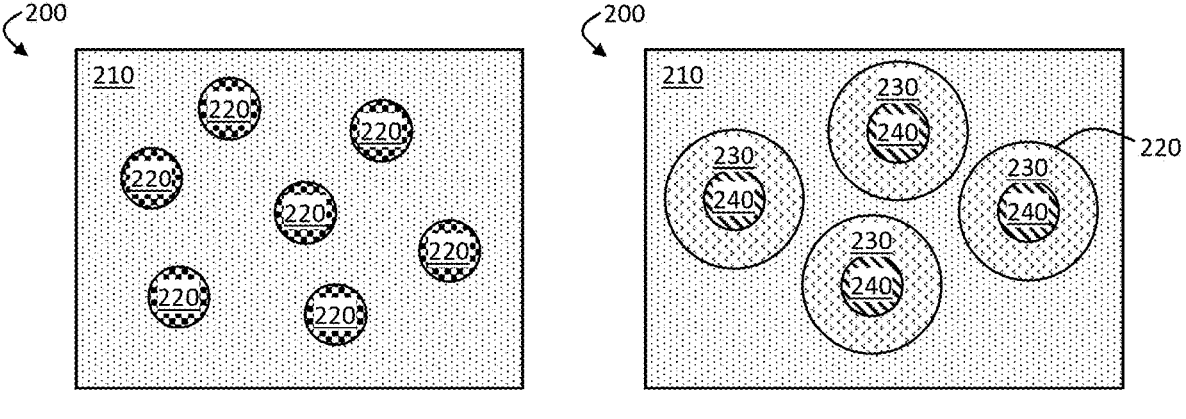
FIG. 2C is a schematic illustration of a hydraulic fracturing composition comprising conductive proppants and a thickening agent, according to some embodiments.
Figure 2C:
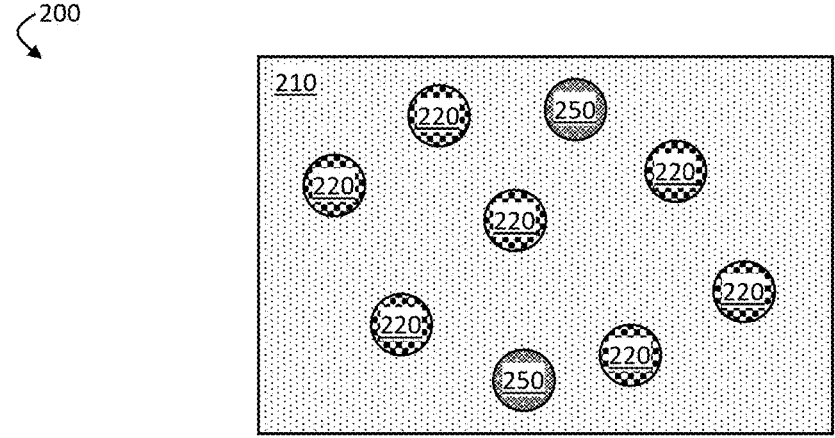

In FIGS. 2A-2C, non-limiting examples of hydraulic fracturing compositions comprising a conductive proppant are schematically illustrated. In FIG. 2A, a hydraulic fracturing composition 200 comprises a transport fluid 210 with a plurality of conductive proppants 220 dispersed within the transport fluid 210, where the proppant may comprise an electrically conductive material. In some embodiments, while flowing the conductive material may be uniformly distributed within the transport fluid. However, after being injected into a reservoir, the conductive material, e.g., a conductive proppant, may become compacted within the fractures such that the proppant particles are in contact with one another. While uncoated conductive materials are shown in FIG. 2A, other configurations are possible. In some such embodiments, the conductive proppant may have a coreshell arrangement. For example, in FIG. 2B, conductive proppant 220 includes a plurality of core shell particles including a conductive coating 230 and a core 240 at least partially encapsulated by the conductive coating. In some embodiments, a plurality of core shell particles may include at least a portion where multiple cores are at least partially encapsulated in a single coating such that the core shell particles include multiple cores within a single particle. In some such embodiments, the core comprises an electrically non-conductive material and the coating comprises an electrically conductive material (e.g., a metallic coating). However, other arrangements are possible, and, in some cases, both the core and the shell may comprise an electrically conductive material. And other configurations other than core shell arrangements are possible, as this disclosure is not so limited.

For some embodiments, it may be advantageous to increase the thickness or viscosity of the hydraulic fracturing. Accordingly, the electrically conductive hydraulic fracturing compositions disclosed herein may also comprise a thickening agent, as mentioned elsewhere herein. FIG. 2C schematically depicts a hydraulic fracturing composition 200 comprising a plurality of conductive proppants 220 dispersed therein and also including thickening agents 250 dispersed in the fluid. Additional details regarding the thickening agent are described elsewhere herein.

Figure 3A:
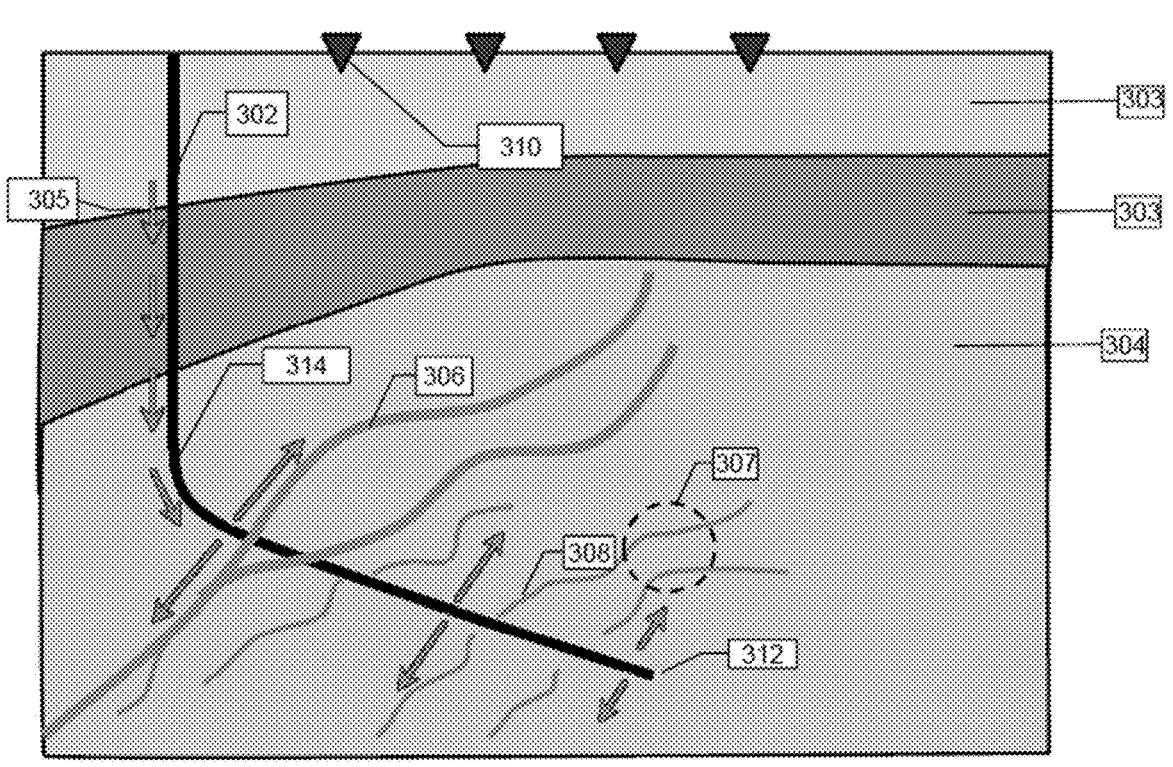
FIGS. 3A-3F schematically illustrate various stages of hydraulic fracturing using a hydraulic fracturing composition comprising a conductive proppant, according to some embodiments.
Figure 3B:
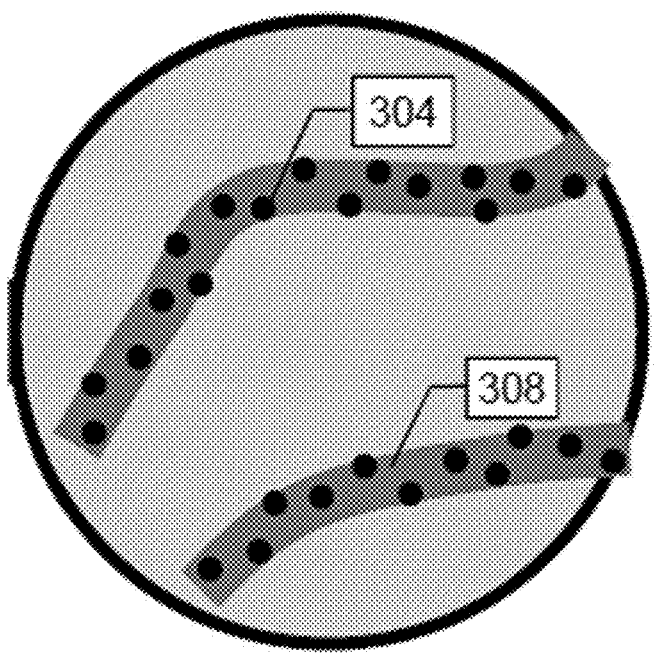

FIGS. 3A-3E schematically depict a method for electro-hydraulic fracturing using electrically conductive hydraulic fracturing fluids. In FIG. 3A, the first well 302 is drilled through one or more rock layers 303 into a target reservoir area 304. The target reservoir area 304 may have little or no in-situ brine as can be found in hot dry rocks in enhanced geothermal systems and/or a low water saturation, such as below 20% water saturation as can be found in hydrocarbon saturated tight/low permeability clastic reservoirs. In such conditions, conventional electrical stimulation can be ineffective, and the present electrical simulation described herein using conductive proppants can increase permeability. Natural hydraulic fractures 306 in the target reservoir area 304 may be injected with an electrically conductive hydraulic fracturing fluid 305 and hydraulic fracturing operations may be conducted in order to stimulate the re-opening of existing natural fractures 306 and the initiation and propagation of new hydraulic fractures 308 (also referred to as artificial fractures) extending away from the first well 302. FIG. 3B is another view of area 307 depicting the new hydraulic fractures 308 filled with electrically conductive proppant 304 from the conductive hydraulic fracturing fluid used to open these new fractures.

The extent and magnitude of existing natural fractures 306 and new hydraulic fractures 308 formed by the fracturing fluid can be monitored and/or mapped by one or more receivers 310. Without wishing to be bound by any particular theory, it is believed that a difference in the resistivity based on the amount of conductive proppant present allows the fracture to be mapped, as resistivity imaging methods can detect the contrast between highly conductive fluid filled fractures and the highly resistive reservoir formation and provide additional information on fracture connectivity and aperture. The receivers can be any combination of magnetotelluric, micro-seismic, and/or electromagnetic imaging receivers configured to monitor, image, and/or map existing natural fractures 306 and new hydraulic fractures 308 (which may collectively refer to the "fracture network") in the target reservoir area 303. As described and elsewhere herein, inclusion of a conductive proppant within the fracturing fluid may increase the contrast between portions of the fracture containing the fracturing fluid relative to portions with less (or no) fracturing fluid. The receivers 310 can monitor, image, and/or map the fracture network concurrently with or separately from the hydraulic fracturing and/or after hydraulic fracturing. The number, amount, type of receivers 310, and measurements taken can vary according to various aspects of the disclosure and according to the geography of a site and the particular system employed to inject the hydraulic fracturing composition. Additionally or alternatively, monitoring, imaging, and mapping can be conducted within the first well 302 by logging borehole characteristics using measure methods such as density/neutron based measurements and/or borehole imaging methods such as acoustic imaging after hydraulic fracturing. Mapping of the fracture network can also show which areas of the first well 302 and target reservoir area 303 exhibit limited hydraulic fracturing initiation and development which might benefit from additional targeted stimulation. For example, the new fractures 308 near the toe 312 of the well 302 may be smaller in comparison to the existing natural fractures 306 and/or other new induced fractures thus making additional electrical stimulation in this area advantageous. In addition, the method may also be applied to fields with existing wells or to fields where additional wells are not yet planned, in order to determine where new wells can be drilled.

Figure 3C:
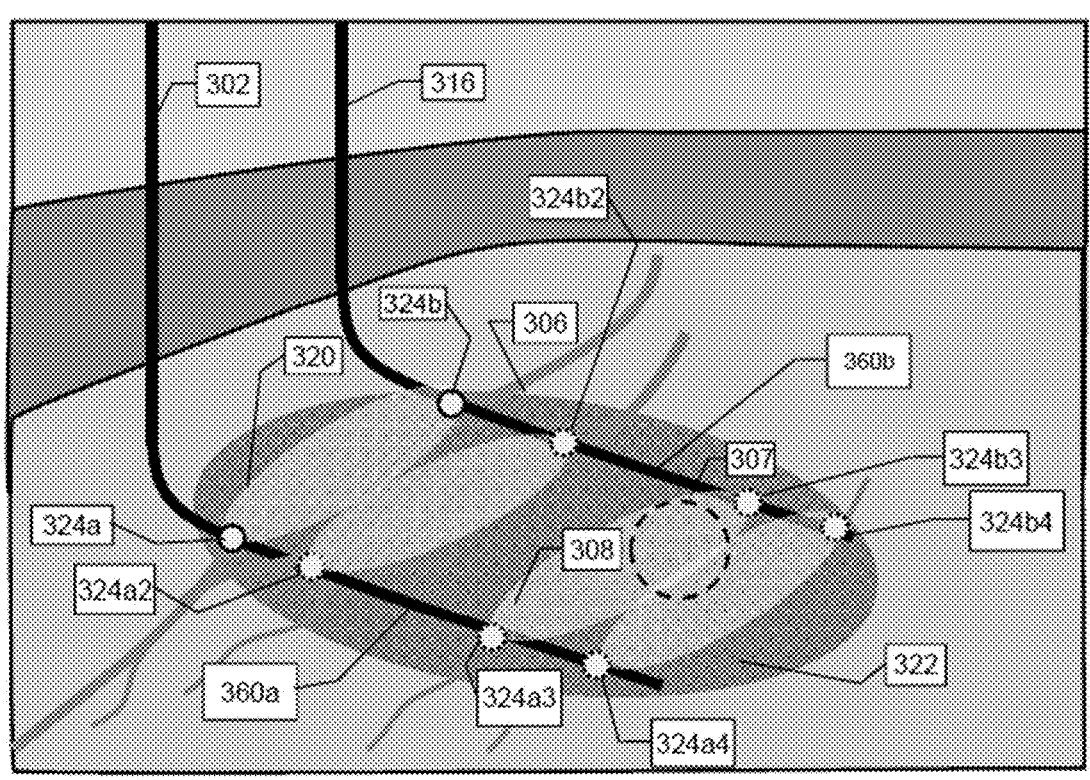

In some embodiments, at least one second well can be drilled. In FIG. 3C, second well 316 is shown. The second well, like the first well, can be any type of well, such as a production well, an injection well, such as a vertical, horizontal, or inclined injection well, or the like. The at least one second well can also include a plurality of wells, according to one or more embodiments. In some embodiments, several wells can be drilled and targeted depending on the fracture network generated. One or more electrodes, 324a and 324b, of opposite charges, can be lowered into the first well 302 and second well 316. This may be accomplished by using high voltage cables 326 having the electrode at one end and being interconnected to one or both of the pulsed power device 302, a direct current (DC) power supply 304, or any other appropriate power supply positioned at the surface. In some instances, the electrode 324a is an anode and electrode 324b can be a cathode, the respective polarities of which can be reversed, as desired.

FIG. 3C schematically depicts electrodes 324a and 324b and one or more additional electrode positions 324a2-324a4 and 324b2-324b4. The electrodes 324a and 324b can be moved to the additional electrode positions within the wells 302 and 316, respectively, by feeding or withdrawing a length of high voltage cables 326 accordingly. In some cases, a plurality of electrodes 324a and 324b can be lowered into each of the respective wells 302 and 316 to achieve simultaneous positioning of the several electrode positions. The electrodes can be attached to a bottom-hole-assembly stimulation tool 330, where the cable is connected to the electrode inside the tool 330 using a connector. The tool 330 enclosure can isolate the electrode from the high pressure and electrically conductive environment of the borehole. The tool 330 can move inside the wellbore to different stimulation zones and electrode positions using mechanisms such as well tractors, a drill string the electrodes are attached to, or any other appropriate method for positioning the electrodes within the wells. Non-conductive insulating packers 360a and 360b can be set both upstream and downstream from the electrode within the borehole (e.g., well) to isolate the operation zone electrically and hydraulically from the rest of the borehole.

Figure 3D:
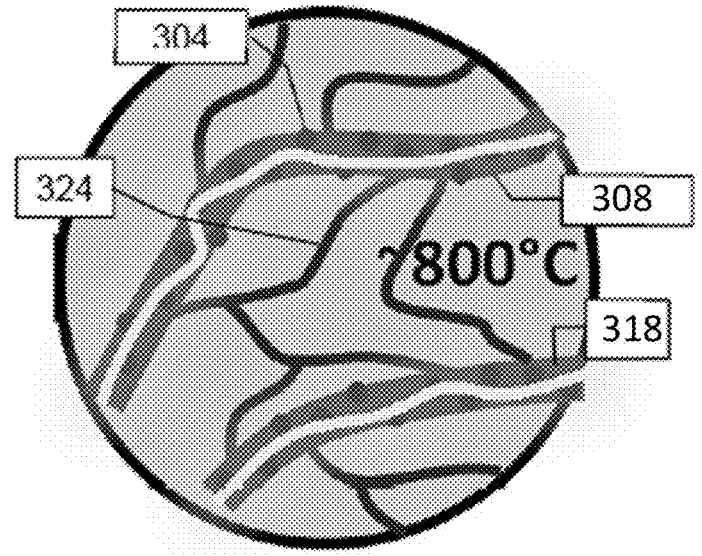

In FIGS. 3C-3D, the pulsed power device 302, powered by electricity line 310, which can receive power from the grid, a generator, a renewable source such as solar, or other power sources, releases a predetermined electrical pulse of electrical energy. The predetermined pulse, or electric shock, can be delivered for a predetermined amount of time, or can be delivered until the electrical impedance between the electrodes 324a, breaches a minimum, indicating peak electrical fracturing has been achieved. Without wishing to be bound by any particular theory, the electrical pulses can cause uneven heating, sudden expansion of minerals or geofluids, and/or vaporization of pore fluid which can result in an increase in rock permeability (e.g., permeability may increase by several orders of magnitude relative to when electrical pulses are not used including, for example, an increase in permeability on the order of $10^8$ relative to when electrical pulses are not used may be provided in some instances). Differential thermal expansion coefficient of the fluid compared to the reservoir rock induces mechanical stresses and micro-fracture propagation due to tensile failure, adding additional permeability to the target zone. In particular, the electrical pulse can increase permeability in fractures toward the toe 312 of each well (302 or 316), which will counter the pressure drop in the target reservoir area 303, and thus prevent short circuiting.

FIG. 3C in particular depicts four discrete stimulation stages where electrode 324a (e.g., anode) is placed at position 324a and electrode 324b (e.g., cathode) is placed at position 324b, the target reservoir area 303 is electrically stimulated (stimulated zone represented generally by 320) for the predetermined time or until an impedance value is reached, then the electrodes (anode and cathode) are moved to locations 324a2 and 324b2 respectively and the stimulation is repeated, then to 324a3 and 324b3, then 324a4 and 324b4. This order may be reversed, and the number of stages is not limited to those shown in the figure. The DC power device 304, which can receive power from the grid, a generator, or other power source, is used to Joule heat the mixture of hydraulic fracturing fluid comprising conductive proppant 308 in the fracture network, or the conductive channels. DC power device 304 can be used to Joule heat the mixture of conductive proppant 308 and transport fluid in the fracture network. Electrical stimulation can advantageously reduce the breakdown pressure needed for hydraulic fracturing by 5-50% and Joule heating of the reservoir area to induce thermal expansion and micro-fracture propagation indicated by 324. Electrical stimulation also allows for targeted stimulation to enhance fracture development in areas identified as having limited hydraulic fracture propagation (represented by electrode pairs 324a, 324b, and 324a2 and 324b2).

FIG. 3D in particular shows a schematic of an enhanced view of zone 320 depicting micro-fracture initiation and propagation 324 away from the hydraulically induced fractures 308 and the electrical current 318 traveling through the electrically conductive fluid 302 and conductive proppant 304.

Figure 3E:
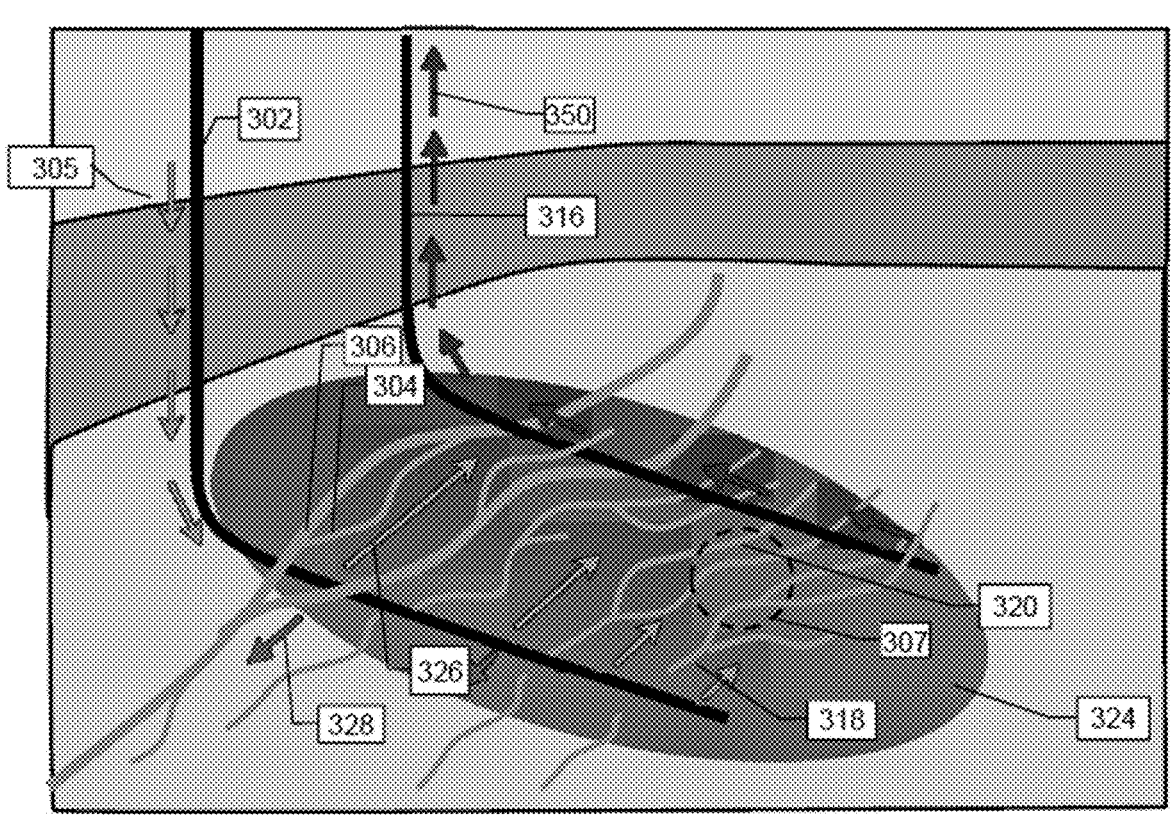
Figure 3F:
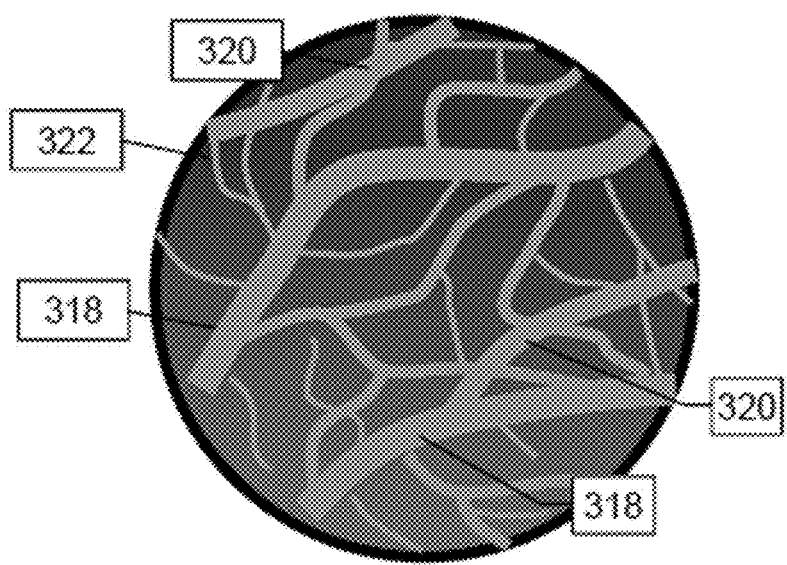

In FIG. 3E, cold water 305 is injected into the first well 302. Because the target reservoir area 303 was heated during electrical stimulation, the injection of a lower temperature liquid, such as surface-temperature water, which is significantly cooler than reservoir temperature, can result in quenching of the heated reservoir 324. Rapid thermal gradients and resulting stresses may be formed within the reservoir which can cause the initiation and propagation of micro-fractures 322 in the direction of fluid flow in the heated region 326. FIG. 3F shows another view of zone 320 depicting fracture initiation and propagation processes. Due to the increased electrical conductivity in portions of the reservoir extending between two adjacent wells associated with the use of electrically conductive hydraulic fluid, applying hydroelectric fracturing using conductive proppants may increase the fracture number and volume within a given region of reservoir rock than hydraulic fracturing without use of a conductive proppant. In some cases, the injected water is heated to reservoir temperature as it is circulated through the fracture network toward the producer well 316. The hot water 350 may be pumped from the well 316 to a geothermal power plant 312 via pipeline 314 and utilized for power generation before being reinjected into well 302.

Figure 4:
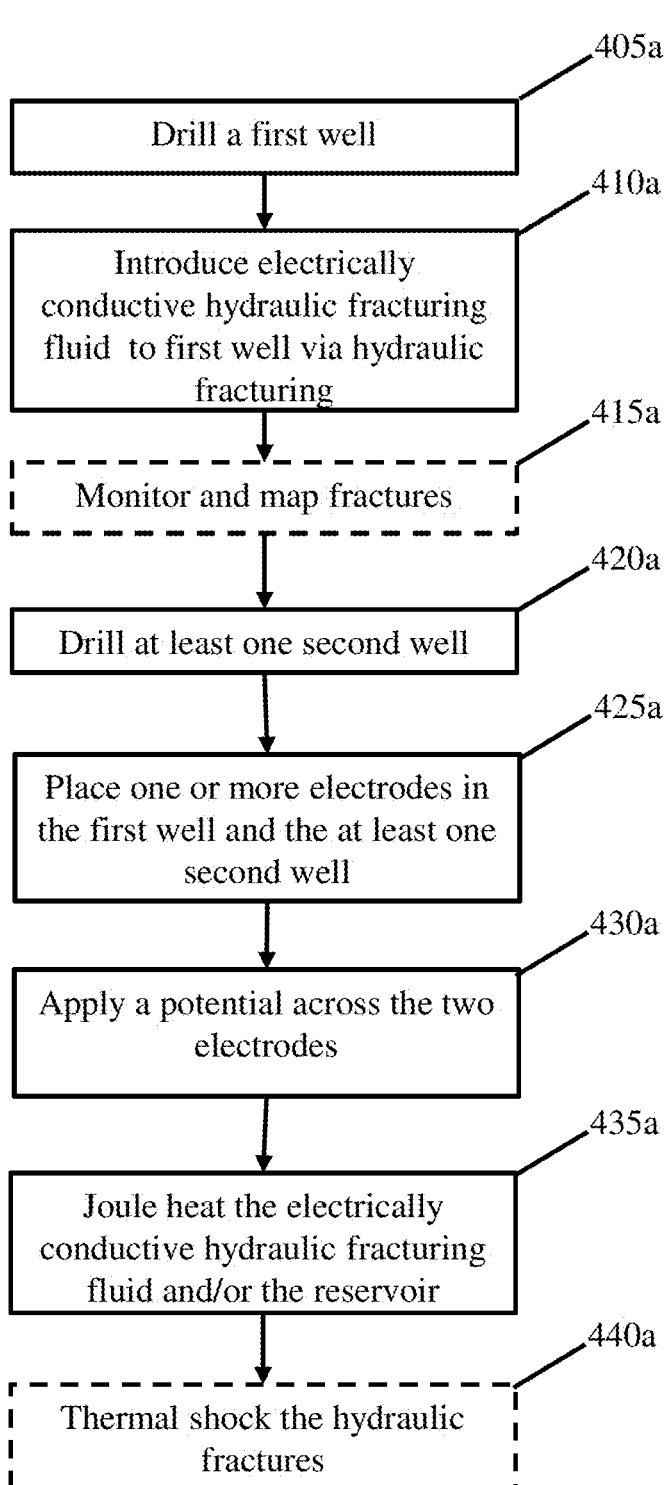
FIG. 4 is a flow chart depicting a method of hydraulic fracturing, according to some embodiments.

FIG. 4 is a flow chart depicting a method 400a of hydraulic fracturing. At block 405a of the figure, a first well is drilled into a reservoir, e.g., within hard dry rock. At block 410a, an electrically conductive hydraulic fracturing composition, which may comprise a conductive material, such as a conductive proppant, can be introduced to the first well. The electrically conductive fracturing fluid may be appropriately pressurized and injected into the first well at pressures sufficient to induce fracturing and/or to introduce the electrically conductive fracturing fluid into the fracture network within the first well. At optional block 415a, the extent and magnitude of existing natural fractures and any new hydraulic fractures may be characterized. This may include performing any appropriate type of characterization of the wells using any appropriate type of one or more receivers. In some embodiments, time-lapse resistivity imaging, such as magnetotellurics, can be coupled with micro-seismic events to characterize and image the fracture network. In other embodiments, resistivity imaging methods can be used to detect the contrast between highly conductive fluid filled fractures and the highly resistive reservoir formation and provide additional information on fracture connectivity and aperture. This may help to provide information related to the connectivity within the different regions of a reservoir which may be used to guide electrohydraulic fracturing processes. For example, if a particular fracture between two portions of a reservoir are large enough that the fracture would function as a short circuit path during electrohydraulic fracturing, an electrohydraulic fracturing process may be electrically isolated from such a fracture. Similarly, if a portion of a reservoir extending between two or more bore holes shows insufficient connectivity from the electrically conductive hydraulic fracturing fluid, and thus would exhibit a reduced effect from electrohydraulic fracturing, then an electrohydraulic fracturing process may be performed elsewhere within the two or more wells. Thus, the noted characterization techniques may be used to target electrohydraulic fracturing processes on one or more portions of a reservoir that show sufficient connectivity to facilitate electrohydraulic fracturing while not exhibiting too large a connectivity such that electrohydraulic fracturing would be ineffective in such a region.

At 420a, at least one second well can be drilled. Based, at least in part, upon the mapping conducted at block 415a, the at least one second well can be targeted and drilled such that it intersects the fracture network created by hydraulic fracturing conducted at block 410a. At block 425a, one or more electrodes of opposite charges are lowered into the first well, the second well, and/or any number of other wells to be targeted during an electrohydraulic fracturing process.

At block 430a, a voltage potential is applied across the electrodes and a current is passed through the reservoir and electrically conductive hydraulic fracturing fluid. A pulsed power device, or other appropriate power source, may release a predetermined electrical pulse, of electrical energy. The predetermined pulse, can be delivered for a predetermined amount of time, or energy, or can be delivered until the electrical impedance between the electrodes, is reduced to a minimum electrical impedance, indicating peak electrical fracturing has been achieved. During application of the voltage potential, at block 435a, the current passing between the electrodes may result in Joule heating of the mixture of transport fluid and conductive proppant 408 in the fracture network as well as the reservoir itself.

At optional block 440a, a cooling fluid, such as a cold liquid (e.g., water or brine), with a temperature less than the heated well can be injected into the first and/or the at least one second well. Because the target reservoir area was heated, the cooling fluid from the surface may be significantly cooler than reservoir temperature, which can cause the initiation and propagation of additional fractures. After block 440a, the electrohydraulic fracturing process described above can optionally be repeated one or more times. The high temperature differential between the super-heated fracture surface and cold injection fluid causes "thermal shock" of the reservoir, which can lower the reservoir breakdown pressure (e.g., by up to 400%) and increase permeability (e.g., by up to four times). As another advantage, the use of conductive proppants may reduce or minimize short circuiting (i.e., fluid pathways between adjacent wells that reduce productivity) by utilizing the electromagnetic properties of the electrically conductive proppant to better characterize fracture properties related to fluid flow. And the electric energy parameters (e.g., voltage, current, duration), and injection parameters (flow rate, time, pressure, temperature), or any combination of these parameters can be adjusted and/or optimized to control the created fracture's width, length, and/or number.

Figure 7:
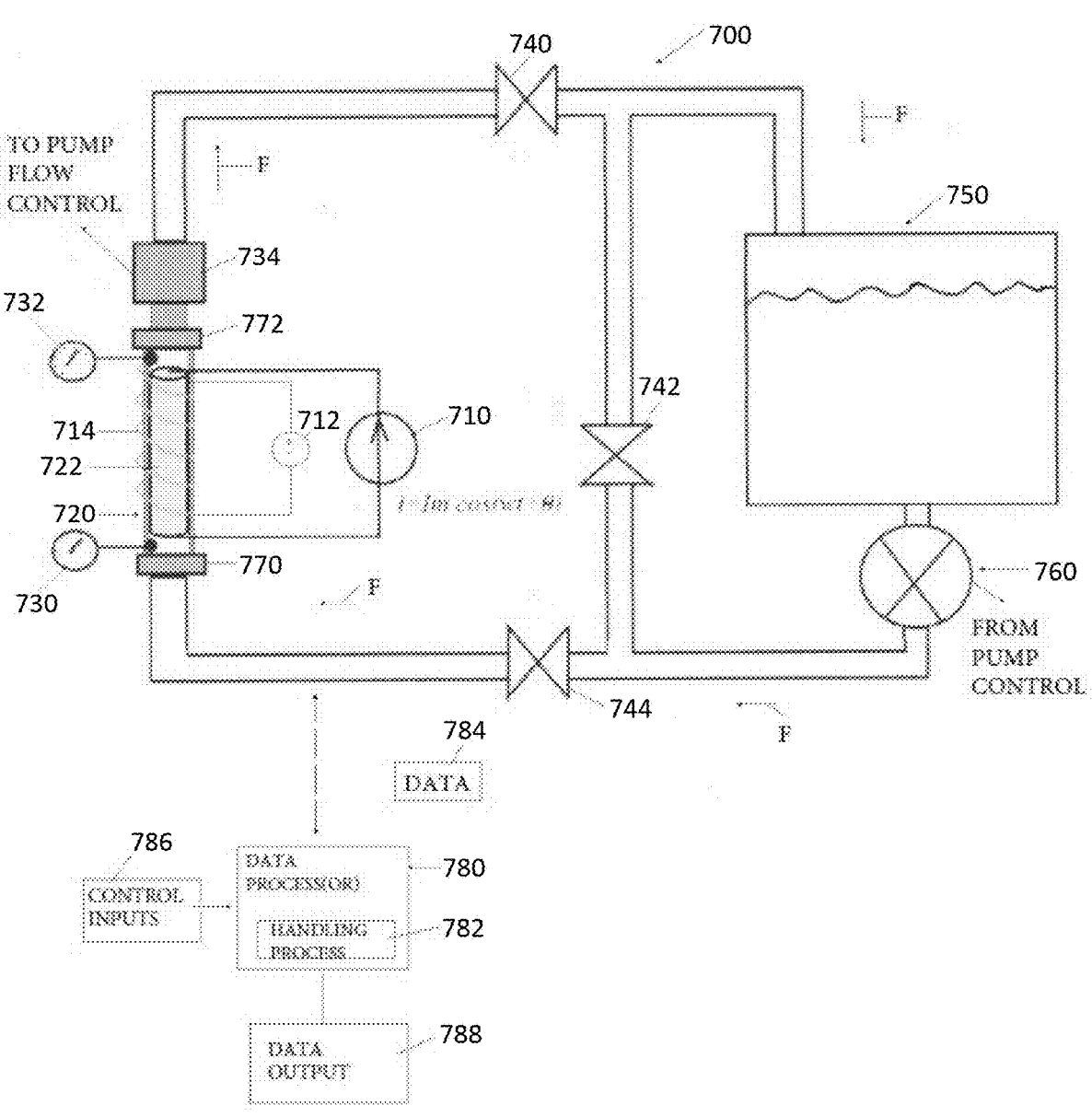
FIG. 7 is a diagram showing an exemplary test arrangement for determining and improving the efficacy of a low-frequency electrical treatment system on various core samples from candidate reservoirs, according to some embodiments.

FIG. 7 shows a generalized arrangement 700 for proof of concept/model of a system and method for increasing reservoir permeability via a Low-Frequency Electrical Treatment (LFET). The arrangement consists of an AC current power source 710 and voltage source 712, which powers a preheating coil 714 (which could be a nichrome heating element, for example) wrapped around a high-pressure-high-temperature (HPHT) cylindrical cell 720. The cell 720 contains a core sample 722, which corresponds to the reservoir rock/sedimentary material. The cell 720 includes an inlet pressure gauge 730 and outlet pressure gauge 732, as well as a flow meter 734 at the outlet thereof. Flow of fluid (arrows F) is controlled by a series of valves 740, 742 and 744. The fluid circuit includes a fluid (water/brine) tank (acting as a fluid capacitor) 750 and associated pump 760.

The arrangement 700 is adapted to simulate the (HPHT) regime close to the reservoir conditions, and how the sample 722 will react to the LFET process applied thereto. High temperature is achieved by the preheater 714, and the high-pressure condition is reached by screw bolt system 770, 772 acting as a piston inside the cylindrical body of the cell. The two pressure gauges 730, 732 read the pressure data at the inlet and outlet stages. The flowmeter 734 provides feedback to control the flow rate at the pump 760. Several (e.g. K-type) thermocouples can be placed along the core sample 722 to read the temperature. All data generated by the sensors, pumps and other devices within the arrangement 700 can be interconnected with a data-acquisition and handling computer (and/or processor) 780 running an appropriate software program 782, such as LabView®, available from National Instruments Corporation of Austin, TX, which is used for collecting and post-processing of the data 784. The computer/processor 780 receives user control inputs 786 to adjust the parameters of the arrangement via an appropriate user interface and the computer/processor outputs status, performance and result data (e.g. textual, numerical, graphical, etc.) 788 via the user interface.

Figure 8:
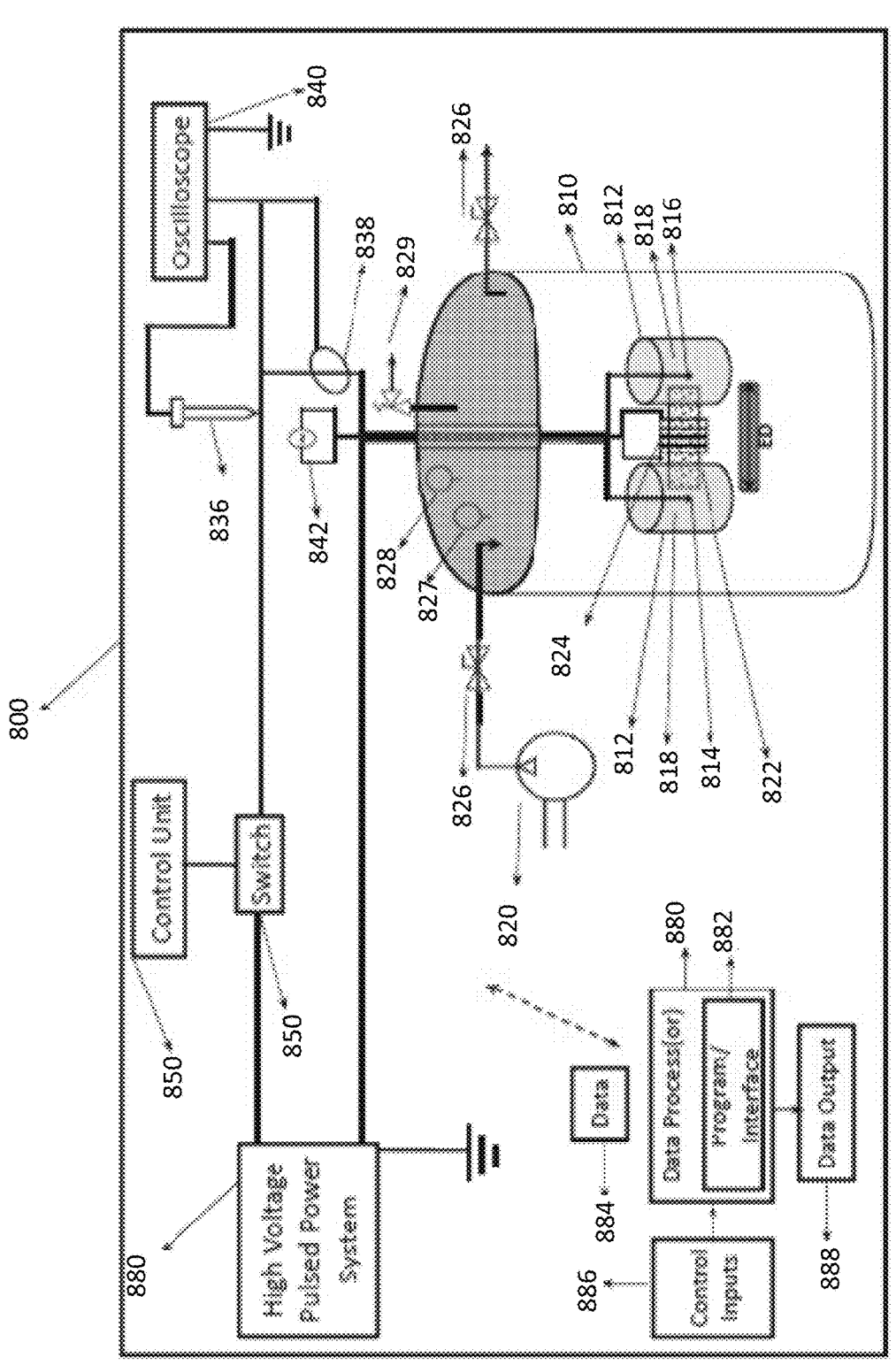
FIG. 8 is a schematic diagram of an exemplary lab scale experimental arrangement for determining and improving the efficacy of a pulsed electrical stimulation system on various core samples from candidate reservoirs, according to some embodiments.

FIG. 8 is a schematic diagram of an exemplary lab scale experimental arrangement for determining and maximizing the efficacy of the pulsed electrical stimulation of core samples 822, and a generalized arrangement 800 for proof of concept/model of a system and method for increasing reservoir permeability via pulsed ERS. The setup consists of High Voltage Pulsed Power System 830, a switch 834 and a controller 850 to configure voltage and pulse settings, an oscilloscope 840 connected to a voltage probe 836 and a current probe 838 to measure transient pulse voltage and current waveforms, and two electrodes 814, 816 extended into the pressure testing chamber 810. The two electrodes 814 and 816 can have an electrode distance ED between them of approximately 1 to 6 inches. Inside the pressure testing chamber 810, there are two thermally and electrically insulated ceramic containers 812 filled with saline brine or other geo-fluids 818. The two ceramic containers 812 hold the rock core sample 822 (which corresponds to the reservoir rock/sedimentary material) in between them through machined holes. The two ceramic containers 812 and the rock core sample 822 can have a sealing system around them. The temperature of the rock sample 822 is controlled by a temperature controller and DC power source. The testing chamber 810 is connected to a compressed air line 820 and its valves 826 to provide expected pressure. High pressure high temperature conditions (HPHT) increase accuracy of the experiment as it simulates reservoir conditions. The pressure chamber can have a temperature sensor 827 and a pressure sensor 828, and safety pressure relief valve 829. Temperature controller 842 powers a preheating coil 824 (e.g., a nichrome heating element) wrapped around core sample 822. The container 812 contains a core sample 822.

All data generated by the sensors, pumps and other devices within the setup and test cell can be interconnected with a data-acquisition and handling computer (and/or processor) 880 running an appropriate software program 882, such as LabView®, which is used for collecting and post-processing of the data 884. The computer/processor 880 receives user control inputs 886 to adjust the parameters of the arrangement via an appropriate user interface and the computer/processor outputs status, performance and result data (e.g. textual, numerical, graphical, etc.) 888 via the user interface.

Figure 9:
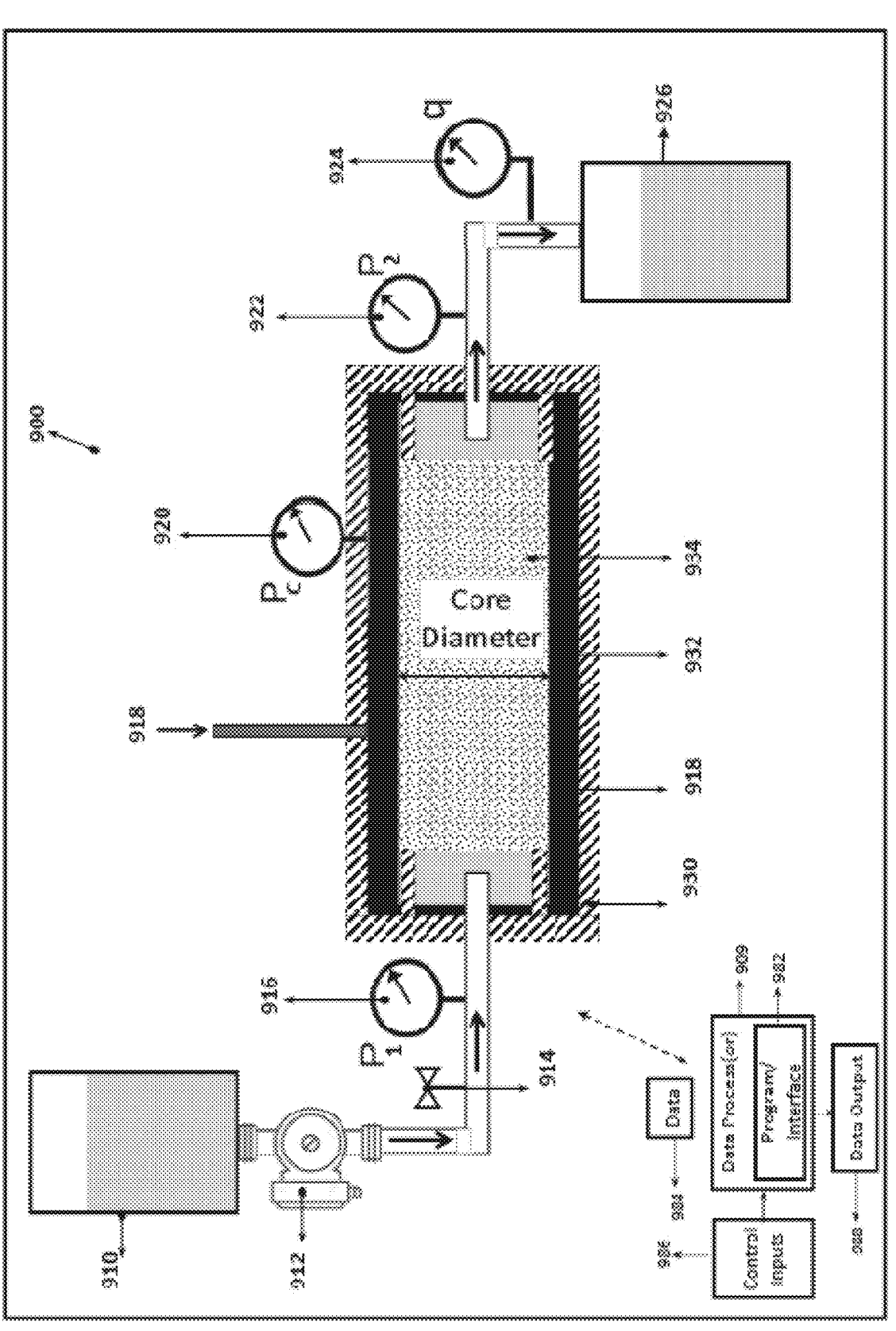
FIG. 9 is a schematic diagram of an apparatus for measuring permeability before and after applying high voltage pulsed discharge on rock sample in the experimental setup of FIG. 8, according to some embodiments.

FIG. 9 is a schematic diagram of an apparatus 900 for measuring permeability before and after running ERS on the samples in the experimental setup of described by FIG. 8. It includes a supply tank 910 and a drained water tank 926, inline pump 912 and testing cell 930 between them, and inlet pressure gauge 916 and outlet pressure gauge 922, as well as a flow meter 924 at the outlet thereof. The cell 930 can include a pressurizing liquid pump 918 and a cell pressure gauge 920 to create and control higher pressures of pressurizing liquid 919 within the cell to provide pressure on the sample 922. A rubber sleeve 922 wrapped around the core sample 922 seals the side of the sample from the pressurizing liquid 919. The testing cell can accommodate different core sample lengths. Flow of fluid is controlled by pump 912 and a valve 914.

The experimental setup is adapted to simulate the (HPHT) regime close to the reservoir conditions, and how the sample (e.g., sample 822) will react to the ERS process applied thereto. High temperature is achieved by the heater and temperature controller, and the high-pressure condition is reached by pump and pressurizing fluid pump 918. The two pressure gauges 916, 922 read the pressure data at the inlet and outlet stages. The flowmeter 924 provides feedback to control the flow rate at the pump 912. Several (e.g. K-type) thermocouples can be placed along the core sample 822 to read the temperature. All data generated by the sensors, pumps and other devices within the setup and test cell can be interconnected with the data-acquisition and handling computer (and/or processor) 880 running an appropriate software program 882, such as LabView®, which is used for collecting and post-processing of the data 884. The computer/processor 880 receives user control inputs 886 to adjust the parameters of the arrangement via an appropriate user interface and the computer/processor outputs status, performance and result data (e.g. textual, numerical, graphical, etc.) 888 via the user interface.

Figure 10:
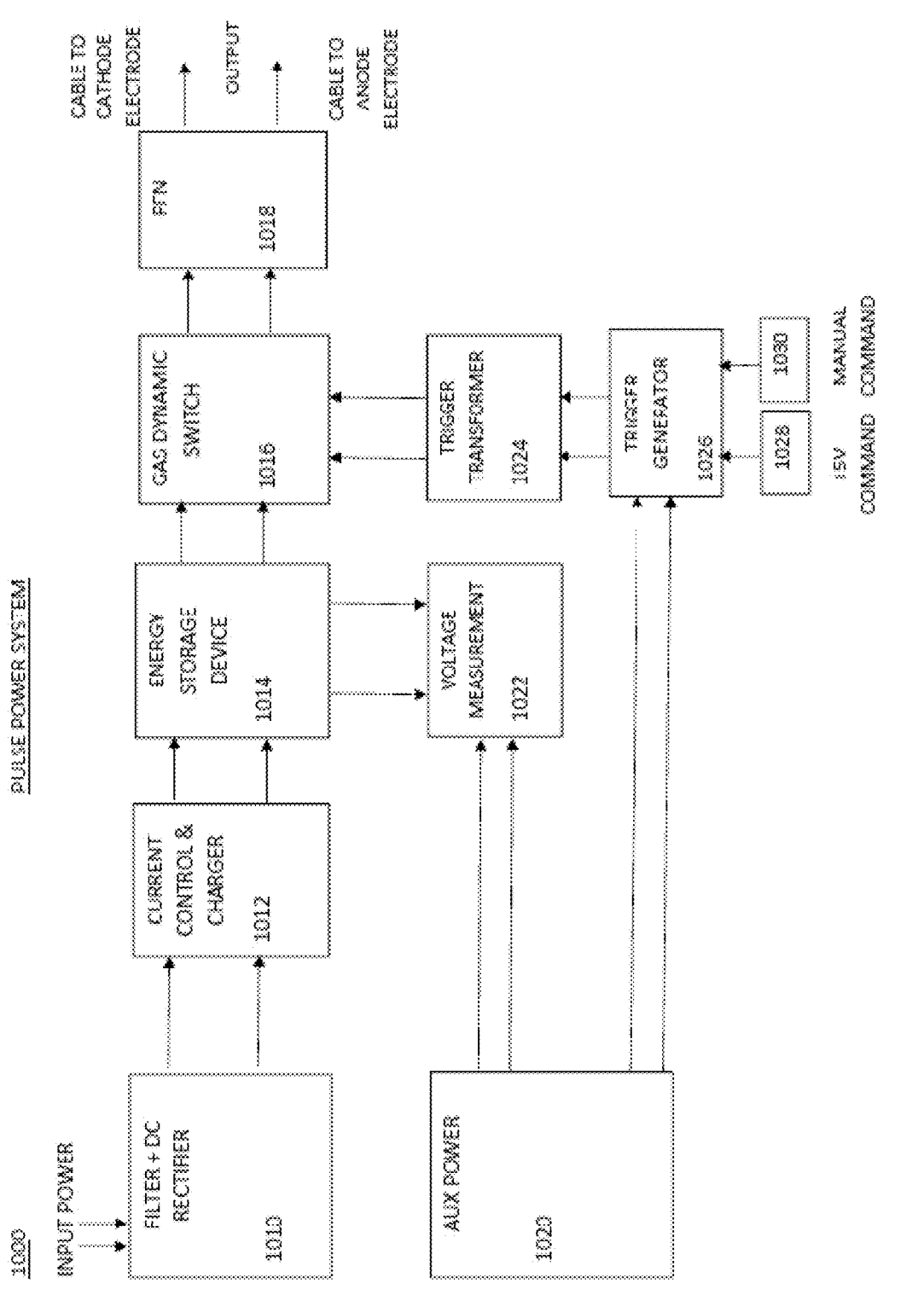
FIG. 10 is a schematic diagram of a pulsed power system, according to some embodiments.

FIG. 10 is a schematic diagram of a pulsed power system, according to at least one illustrative embodiment. The pulsed power system 1000 which is based on the principle of parallel charge and parallel discharge of very low inductance strip line capacitors through suitable spark gap systems which can handle peak currents and electrical stresses. It can have 110 V or 230 V or higher voltage alternating current as input power and consists of a filter and DC rectifier 1010 to convert AC to DC, current control and charger to 1012 store energy in energy storage devices 1014 such as capacitor banks, gas dynamic switch 616 such as spark gap to discharge stored capacitor bank energy which can be adjusted for different voltage levels, pulsed forming network (PFN) 1018 to form pulse shapes. The system can be started manually using manual command 1030 or it can be attached with a +5 volts command 1028 input to fire the generator. This can also be used to synchronize it with another scientific event which will have a +5 volts output pulse. Also, it is possible to fire the system using more voltage as well, if an attenuator is built. The trigger generator 1026 will be able to be switched on and off. This generator should be switched on during operation which is connected to the switch by trigger transformer 1024. Auxiliary power 1020 feeds a real time voltage measurement system 1022, trigger and command lines.

In some embodiments, a method comprises injecting electrically conductive proppant in natural or artificial fractures of reservoir and releasing electrical energy that propagates through the proppant and dissipates as heat to increase a permeability of the fractures.

In some embodiments, the method further comprises drilling a first well prior to injecting the electrically conductive proppant.

In some embodiments, the method further comprises mapping a fracture network and fracture size while injecting electrically-conductive proppant; and drilling a second well at a second well position based upon the mapped fractured network such that the second well intersects with the fracture network created by the injecting of the electrically-conductive proppant.

In some embodiments, the method further comprises placing one or more electrodes into one or more wells; and releasing the electrical energy from the one or more electrodes.

In some embodiments, the method comprises the releasing electrical energy comprises emitting an electrical pulse between electrodes; and joule heating the reservoir.

In some embodiments, the method further comprises thermally shocking the reservoir.

In some embodiments, the method further comprises adjusting one of electric energy parameters or injection parameters to control a length, width, or number of artificial fractures.

In some embodiments, the method is described wherein a rock breakdown pressure is reduced by up to 400% or more after releasing the electrical energy.

In some embodiments, the method is described wherein short-circuiting between wells is mitigated by reducing a pressure drop in monitored and targeted areas in the reservoir under proppant injection and electro-hydro fracturing operations.

In some embodiments, a method is described wherein the first well is a vertical, horizontal, or inclined well (e.g., relative to a direction of gravity), and is an injection or production well.

In some embodiments, a method is described wherein the second well is a vertical, horizontal, or inclined well, and is an injection or production well.

In some embodiments, a system comprising a hydraulic fracturing pump configured to inject an electrically conductive proppant into natural or artificial fractures of reservoir and one or more electrodes configured to release electrical energy that propagates through the electrically conductive proppant and dissipates as heat to increase a permeability of the natural or artificial fractures.

In some embodiments, a system is described wherein the electrical energy comprises at least one of: one or more electrical pulses, or continuous electricity.

In some embodiments, the system further comprises one or more wells configured to receive the electrically conductive proppant.

In some embodiments, a rock breakdown pressure of the system is reduced by up to 400% or more after releasing the electrical energy.

In some embodiments, a system is described wherein the electrically conductive proppant comprises calcined coke.

The following examples are intended to illustrate certain embodiments of the present invention, but do not exemplify the full scope of the invention.

Example 1

The following example describes the fracturing of a subterranean reservoir using carbon dioxide ($CO_2$) as a transport fluid and a conductive proppant.

Table 1 provides several conductive proppants that were tested in this example.

TABLE 1

| Select Conductive Proppants | | | | |
|---|---|---|---|---|
| conductive proppant | Size [mesh] | Conductivity [S/m] | Tested Pressure [MPa] | Tested temperature [° C.] |
| ceramic particles with a metallic coating | 20/40 | 2000 | 41 | 150 |
| petroleum coke | 50/100 | 5000 | 27.6 | 135 |

Table 2 provides several transport fluids for select hydraulic fracturing compositions.

TABLE 2

| Select Transport Fluids | | | | |
|---|---|---|---|---|
| fracking fluid | Viscosity [Pa · s] | Conductivity [S/m] | Tested Temperature [° C.] | Tested Pressure [MPa] |
| slick water | 1E−3 | 3.7 | 75 | 140 |
| liquefied petroleum gas | 8E−5 | — | 100.5 | 70 |
| CO2 + polymer | 5E−3/ 2E−3 | — | 25/100 | 36 |

Figure 5:
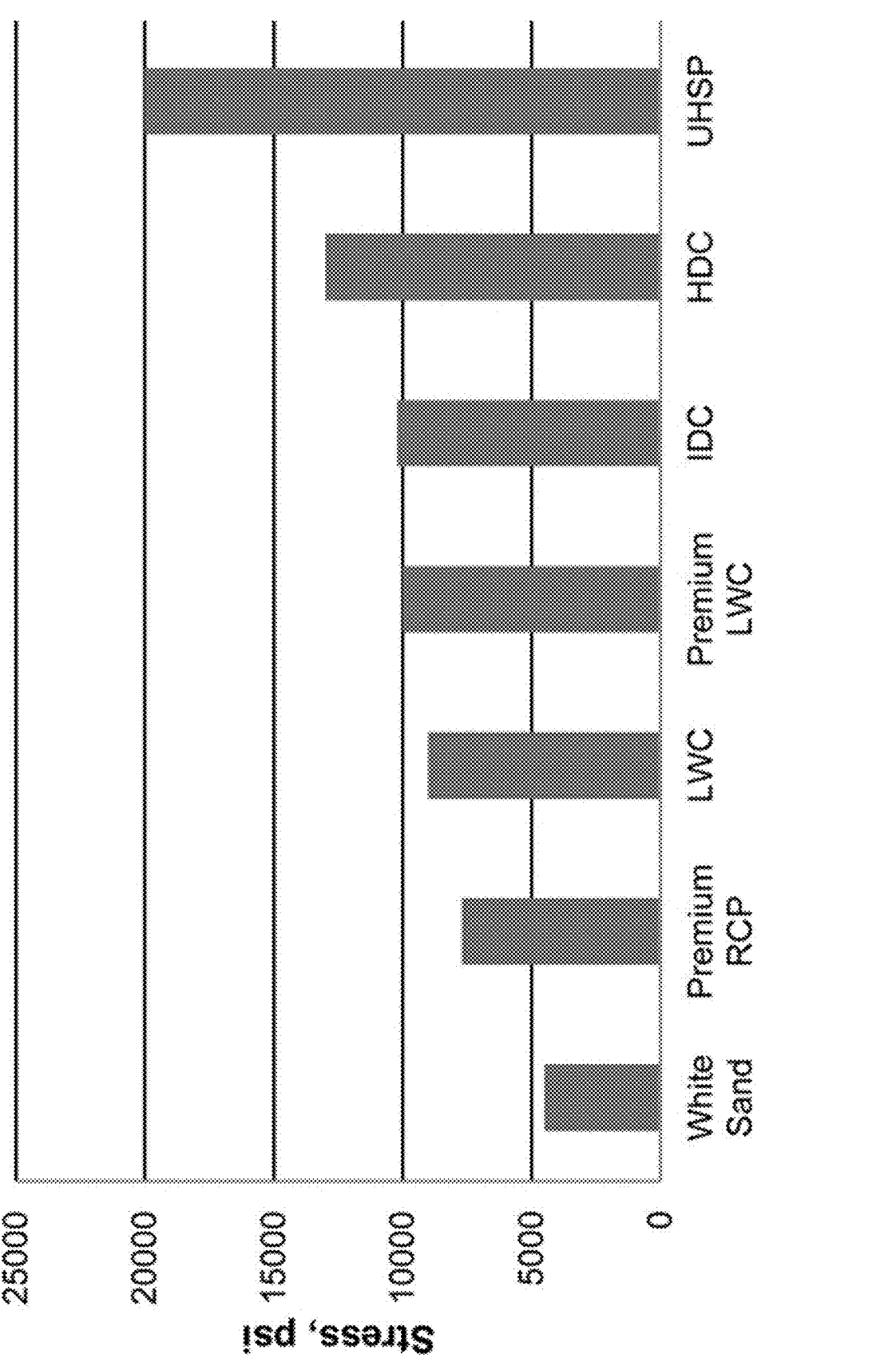
FIG. 5 shows the mechanical stress at which ~1750 mD-ft fracture conductivity is maintained for different types of proppants including some lightweight ceramics (LWC), intermediate density ceramics (IDC), high density ceramics (HDC), and ultra-high-strength proppants (UHSP), according to some embodiments.

In order to allow the $CO_2$ transport fluid to carry the proppant, a polymer was used to thicken the fluid. The hydraulic fracturing composition comprising these components functions the same beyond the testing conditions described in this example. The fluid proppant mixture conductivity is affected, at least in part, by the proppant conductivity and concentration. These proppants also have the strength to sustain the in situ stress of the reservoir to maintain certain permeability (FIG. 5).

Ceramic proppants may be further divided into three broad classifications based on their density: namely, lightweight ceramics (LWC), intermediate density ceramics (IDC) and high-density ceramics (HDC). The alumina content of ceramic proppants correlates well with the pellet strength and the proppant density. The approximate correlation between alumina content and the mechanical strength of the proppant grains are of high quality and manufactured in a manner which reduces internal porosity. LWC typically contains 45-50% alumina; IDC contains 70-75% alumina; HDC contains 80-85% alumina. Some proppants are referred to as ultra-high-strength proppant (UHSP) can be rated to 20,000 psi, 140 MPa, in crushing strength, and may have a relatively high alumina content.

Figure 6:
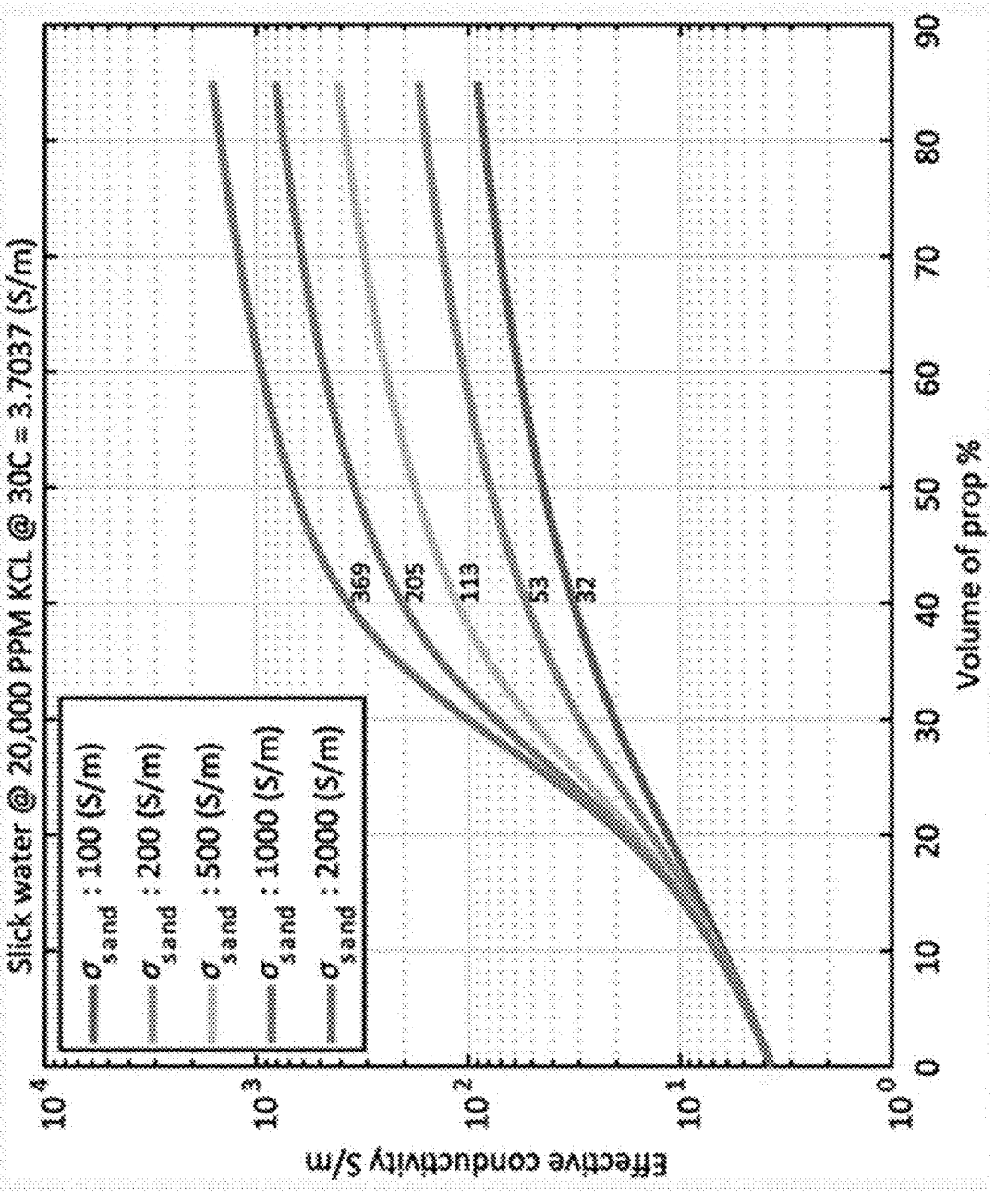
FIG. 6 is plot of the volume of conductive proppant within the hydraulic fracturing composition with respect to the effective conductivity of the hydraulic fracturing composition with slurry electrical conductivities for five values of proppant conductivity shown as functions of volume concentrations, according to some embodiments.

As shown in FIG. 6, as the volume of conductive proppant within the slurry of the hydraulic fracturing composition increases, the effective conductivity of the composition generally increases. Thus, conductive proppants may increase the conductivity of a reservoir comprising the slurry.

The invention claimed is:

1. A system comprising:

two or more electrodes configured to apply an electrical potential between at least two well bores using electrohydraulic fracturing to heat at least a portion of a reservoir to a first temperature and to induce fracture propagation in a fracture network between the at least two well bores; and one or more pumps, wherein at least one of the one or more pumps being configured to inject a hydraulic fracturing composition comprising a transport fluid and a conductive proppant into the reservoir, wherein the two or more electrodes are configured to heat the hydraulic fracturing composition to a temperature between or equal to 500° C. and 1,000° C., wherein at least one of the one or more pumps is configured to inject a cooling fluid into the heated portion of the reservoir after the fracture propagation to thermally shock the reservoir to generate additional fracturing in the fracture network, wherein the cooling fluid is at a second temperature less than the first temperature when injected into the reservoir, wherein the reservoir is a geothermal reservoir, wherein the cooling fluid is heated following injection into the reservoir, and wherein at least one of the one or more pumps is configured to pump the heated cooling fluid from the geothermal reservoir after fracturing.

2. The system of claim 1, wherein the cooling fluid is water or brine.

3. The system of claim 1, wherein the one or more pumps are configured to flow the cooling fluid through the heated portion of the reservoir.

4. The system of claim 1, wherein the second temperature is a surface temperature.

5. The system of claim 1, wherein the second temperature is less than or equal to 20° C.

6. The system of claim 1, wherein the conductive proppant comprises petroleum coke.

7. The system of claim 6, wherein the conductive proppant comprises conductive carbon particles.

8. The system of claim 6, wherein the conductive proppant comprises ceramic particles.

9. The system of claim 6, wherein the conductive proppant comprises ceramic particles comprising a metallic coating.

10. The system of claim 1, wherein the two or more electrodes are configured to apply a plurality of electrical pulses between the at least two well bores.

11. The system of claim 1, wherein the electrical potential has a voltage greater than or equal to 1 kV and less than or equal to 100 kV.

12. The system of claim 1, wherein the electrical potential has a power greater than or equal to 1 MW and less than or equal to 1,000 MW.

13. The system of claim 1, wherein the two or more electrodes are configured to heat the hydraulic fracturing composition to a temperature between or equal to 750° C. and 900° C.

14. The system of claim 1, wherein the one or more pumps are configured to pump the heated fluid from reservoir to a geothermal power plant.

15. A method for fracturing a reservoir, the method comprising:

injecting a hydraulic fracturing composition comprising a transport fluid and a conductive proppant into the reservoir;

applying an electrical potential between at least two well bores using electrohydraulic fracturing to heat the reservoir to a first temperature and induce fracture propagation in a fracture network between the at least two well bores, wherein applying the electrical potential heats the hydraulic fracturing composition to a temperature between or equal to 500° C. and 1,000° C.;

injecting a cooling fluid into the reservoir after the fracture propagation to thermally shock the reservoir to generate additional fracturing in the fracture network, wherein the cooling fluid is at a second temperature less than the first temperature when injected into the reservoir, wherein the reservoir is a geothermal reservoir, and wherein the cooling fluid is heated following injection into the reservoir; and pumping the heated cooling fluid from the geothermal reservoir after fracturing.

16. The method of claim 15, wherein the cooling fluid is water or brine.

17. The method of claim 15, further comprising flowing the cooling fluid through a heated region of the reservoir.

18. The method of claim 15, wherein the second temperature is a surface temperature.

19. The method of claim 18, wherein the second temperature is less than or equal to 20° C.

20. The method of claim 15, further comprising determining an electrical resistivity of portions of the reservoir filled with the hydraulic fracturing composition and determining an electrical resistivity of at least some portions of the reservoir not filled with the hydraulic fracturing composition.

21. The method of claim 15, wherein applying the electrical potential between the at least two well bores includes applying a plurality of electrical pulses.

22. The method of claim 15, wherein applying the electrical potential heats the hydraulic fracturing composition to a temperature between or equal to 750° C. and 900° C.

23. The method of claim 15, wherein pumping the heated fluid from the geothermal reservoir includes pumping the heated fluid from the reservoir to a geothermal power plant.

24. A method for fracturing a reservoir, the method comprising:

injecting a hydraulic fracturing composition comprising a transport fluid and a conductive proppant into the reservoir;

applying an electrical potential between at least two well bores using electrohydraulic fracturing to heat the reservoir to a first temperature and induce fracture propagation in a fracture network between the at least two well bores, wherein applying the electrical potential heats the hydraulic fracturing composition to a temperature between or equal to 500° C. and 1,000° C.;

injecting a cooling fluid into the reservoir after the fracture propagation to thermally shock the reservoir to generate additional fracturing in the fracture network, wherein the cooling fluid is at a second temperature less than the first temperature when injected into the reservoir, wherein the reservoir is a mineral mining reservoir, and wherein the cooling fluid is heated following injection into the reservoir; and pumping the heated cooling fluid from the mineral mining reservoir after fracturing.

25. The method of claim 24, further comprising flowing the cooling fluid through a heated region of the reservoir.

26. The method of claim 24, further comprising determining an electrical resistivity of portions of the reservoir filled with the hydraulic fracturing composition and determining an electrical resistivity of at least some portions of the reservoir not filled with the hydraulic fracturing composition.

27. The method of claim 24, wherein the second temperature is less than or equal to 20° C.

\*    \*    \*    \*    \*